United States Patent
Makin, III et al.

(10) Patent No.: US 12,320,949 B2
(45) Date of Patent: Jun. 3, 2025

(54) ADVANCED WARNING FOR SOLAR FLARES FROM PHOTOSPHERE IMAGE ANALYSIS

(71) Applicant: THE BOARD OF TRUSTEES OF WESTERN MICHIGAN UNIVERSITY, Kalamazoo, MI (US)

(72) Inventors: Robert Allen Makin, III, Kalamazoo, MI (US); Steven Michael Durbin, Kalamazoo, MI (US)

(73) Assignee: Board of Trustees of Western Michigan University, Kalamazoo, MI (US)

(*) Notice: Subject to any disclaimer, the term of this patent is extended or adjusted under 35 U.S.C. 154(b) by 165 days.

(21) Appl. No.: 17/735,729

(22) Filed: May 3, 2022

(65) Prior Publication Data

US 2022/0365243 A1    Nov. 17, 2022

Related U.S. Application Data

(60) Provisional application No. 63/192,709, filed on May 25, 2021, provisional application No. 63/183,192, filed on May 3, 2021.

(51) Int. Cl.
*G01W 1/10* (2006.01)
*G06V 10/25* (2022.01)
(Continued)

(52) U.S. Cl.
CPC ............... *G01W 1/10* (2013.01); *G06V 10/25* (2022.01); *G06V 10/507* (2022.01); *G06V 20/46* (2022.01)

(58) Field of Classification Search
CPC ......... G01W 1/10; G06V 10/25; G06V 10/28; G06V 10/507; G06V 20/46
See application file for complete search history.

(56) References Cited

U.S. PATENT DOCUMENTS

| | | |
|---|---|---|
| 3,309,553 A | 3/1967 | Kroemer |
| 3,413,533 A | 11/1968 | Kroemer et al. |

(Continued)

FOREIGN PATENT DOCUMENTS

| | | | |
|---|---|---|---|
| CN | 104156981 A | * 11/2014 | |
| CN | 109035663 A | * 12/2018 | ........... G08B 17/005 |

(Continued)

OTHER PUBLICATIONS

Grundy, W.M. et al, "Surface compositions across Pluto and Charon," Science 351, 10.1126/science.aad9189 (2016), publisher: American Association for the Advancement of Science.

(Continued)

*Primary Examiner* — Yoshihisa Ishizuka
(74) *Attorney, Agent, or Firm* — David J Johnson

(57) ABSTRACT

A method for quantifying disorder and extracting a corresponding numerical value of an order parameter from contrast analysis applied to optical images acquired of the solar photosphere. Temporal variation of the order parameter may be utilized to predict events such as solar flares, which have the ability to disrupt both communication systems and satellite orbits. The degree of order of the photosphere may be monitored to predict solar flares and other solar events. The method may utilize a spin-based (Ising/Potts) model of disorder.

19 Claims, 9 Drawing Sheets
(2 of 9 Drawing Sheet(s) Filed in Color)

(51) Int. Cl.
  *G06V 10/50* (2022.01)
  *G06V 20/40* (2022.01)

(56) References Cited

U.S. PATENT DOCUMENTS

| | | | |
|---|---|---|---|
| 4,792,832 | A | 12/1988 | Baba et al. |
| 4,833,101 | A | 5/1989 | Fujii |
| 4,978,853 | A | 12/1990 | Hilal |
| 7,951,494 | B2 | 5/2011 | Sawa et al. |
| 8,981,382 | B2 | 3/2015 | Gao |
| 9,622,698 | B2 | 4/2017 | Mestha et al. |
| 9,864,903 | B2 | 1/2018 | Cheswick |
| 9,876,248 | B2 | 1/2018 | Hiraiwa et al. |
| 10,381,673 | B2 | 8/2019 | Miller et al. |
| 10,446,189 | B2 | 10/2019 | Zukerman et al. |
| 10,810,725 | B1 | 10/2020 | Dolhansky et al. |
| 11,545,563 | B2 | 1/2023 | Makin, III et al. |
| 2013/0240026 | A1 | 9/2013 | Atwater et al. |
| 2015/0213305 | A1 | 7/2015 | Sundstrom |
| 2016/0140405 | A1 | 5/2016 | Graumann et al. |
| 2017/0172487 | A1 | 6/2017 | Aharon |
| 2018/0083155 | A1 | 3/2018 | Mahajan et al. |
| 2018/0122969 | A1 | 5/2018 | Olenick et al. |
| 2018/0361287 | A1 | 12/2018 | Zhang |
| 2019/0168144 | A1 | 6/2019 | Umebayashi |
| 2020/0227751 | A1 | 7/2020 | Mimura et al. |
| 2020/0334347 | A1 | 10/2020 | Hoyos et al. |
| 2021/0036310 | A1 | 2/2021 | Hou et al. |
| 2021/0117690 | A1 | 4/2021 | Ye |
| 2021/0119237 | A1 | 4/2021 | Lee et al. |
| 2021/0202988 | A1 | 7/2021 | Kim et al. |
| 2021/0349093 | A1 | 11/2021 | Makin, III et al. |
| 2021/0359324 | A1 | 11/2021 | Armstrong |
| 2022/0121884 | A1 | 4/2022 | Zadeh et al. |
| 2022/0347610 | A1 | 11/2022 | Makin, III et al. |
| 2022/0365243 | A1 | 11/2022 | Makin, III et al. |
| 2023/0000426 | A1 | 1/2023 | Makin, III et al. |

FOREIGN PATENT DOCUMENTS

| | | |
|---|---|---|
| CN | 111260645 A | 6/2020 |
| CN | 113435292 A | 9/2021 |
| EP | 3629232 A1 | 4/2020 |
| JP | 6191368 B2 | 9/2017 |
| WO | 2014072375 A1 | 5/2014 |
| WO | 2021137946 A1 | 7/2021 |
| WO | PCT/US23/24135 | 6/2023 |
| WO | PCT/US23/24243 | 6/2023 |

OTHER PUBLICATIONS

Jarrett, T., "Large Scale Structure in the Local Universe," Tile 2MASS Galaxy Catalog, Publications of the Astronomical Society of Australia 21, 396 (2004), 6 pages.

R. A. et al, The sixteenth data release of the sloan digital sky surveys: First release from the apogee-2 southern survey and full release of eboss spectra (2019), 22 pages.

Ulrich, RK., "The Five-Minute Osciliations on the Solar Surface," The Astrophysical Journal 162,993 (1970).

Updated Recommendations for the Use of Typhoid Vaccine Advisory Committee on Immunization Practices, United States, 2015, 6 pages.

Zhang, H. et al., "Efficient Neural Network Robustness Certification with General Activation Functions," in Advances in Neural Information Processing Systems 31, edited by S. Bengio, H. Wallach, H. Larochelle, K. Grauman, N. Cesa-Bianchi, and R. Garnett (Curran Associates, Inc., 2018) pp. 4939-4948, 10 pages.

Ziethlow, V. et al., "Assessment by electron-microscopy of recombinant Vibrio cholerae and *Salmoneila* vaccine strains expressing enterotoxigenic *Escherichia coli*-specific surface antigens," Clinical Microbiology and Infection 14, 282 (2008), 5 pages.

A. Rössler, D. Cozzolino, L. Verdoliva, C. Riess, J. Thies, and M. Nießner, "FaceForensics++: Learning to Detect Manipulated Facial Images," 2019.

D. M. Montserrat et al., "Deepfakes Detection with Automatic Face Weighting," 2020 IEEE/CVF Conference on Computer Vision and Pattern Recognition Workshops (CVPRW), Seattle, WA, USA, 2020, pp. 2851-2859, doi: 10.1109/CVPRW50498.2020.00342.

ISR for PCT/US23/24135 dated Sep. 7, 2023.

K. Taya, N. Kuroki, N. Takeda, T. Hirose and M. Numa, "Detecting tampered regions in JPEG images via CNN," 2020 18th IEEE International New Circuits and Systems Conference (NEWCAS), Montreal, QC, Canada, 2020, pp. 202-205, doi: 10.1109/NEWCAS49341.2020.9159761.

Kohli, & Gupta, A. (2021). Detecting DeepFake, FaceSwap and Face2Face facial forgeries using frequency CNN. Multimedia Tools and Applications, 80(12), 18461-18478. https://doi.org/10.1007/s11042-020-10420-8.

Mazaheri, G., Roy-Chowdhury, A. K. (2022). Detection and localization of facial expression manipulations. 2022 IEEE/CVF Winter Conference on Applications of Computer Vision (WACV). https://doi.org/10.1109/https://doi.org/10.1109/wacv51458.2022.00283.

S. Agarwal, H. Farid, O. Fried and M. Agrawala, "Detecting Deep-Fake Videos from Phoneme-Viseme Mismatches," 2020 IEEE/CVF Conference on Computer Vision and Pattern Recognition Workshops (CVPRW), Seattle, WA, USA, 2020, pp. 2814-2822, doi: 10.1109/CVPRW50498.2020.00338.

Sun, Y., Zhang, Z., Qiu, C., Wang, L., Sun, L., Wang, Z. (2022). Faketransformer: Exposing face forgery from spatial-temporal representation modeled by facial pixel variations. 2022 7th International Conference on Intelligent Computing and Signal Processing (ICSP). https://doi.org/10.1109/icsp54964.2022.9778420.

Z. Zhang, C. Mal, B. Ding and M. Gao, "Detecting Manipulated Facial Videos: A Time Series Solution," 2020 25th International Conference on Pattern Recognition (ICPR), Milan, Italy, 2021, pp. 2817-2823, doi: 10.1109/ICPR48806.2021.9412610.

C. Ciszak et al., "Raman spectra analysis of ZrO2 thermally grown on Zircaloy substrates irradiated with heavy ion: Effects of oxygen isotopic substitution," Journal of Raman Spectroscopy, vol. 50, No. 3, pp. 425-435, 2019.

C. Zhang et al., "Ionic conductivity and its temperature dependence of atmospheric plasmasprayed yttria stabilized zirconia electrolyte," Materials Science and Engineering: B, vol. 137, No. 1, pp. 24-30, Feb. 2007.

Chen, X.J., et al. "Influence of microstructure on the ionic conductivity of yttria-stabilized zirconia electrolyte." Materials Science and Engineering A vol. 335 p. 246-252 [online]. Sep. 25, 2002 (Sep. 25, 2002) (retrieved on Aug. 2, 2023) Retrieved from the Internet: <URL: https://www.sciencedirect.com/science/article/abs/pii/S0921509301019359> <DOI: 10.1016/S0921-5093(01 )01935-9>.

D. Chen, S. Su, Z. Yu and L. Lu, "Geometrical Optimization of the Composite Cathode in a Solid Oxide Fuel Cell," 2011 Asia-Pacific Power and Energy Engineering Conference, Wuhan, China, 2011, pp. 1-4, doi: 10.1109/APPEEC.2011.5748908.

F. T. Ciacchi, K. M. Crane, and S. P. S. Badwal, "Evaluation of commercial zirconia powders forsolid oxide fuel cells," Solid State Ionics, vol. 73, No. 1, pp. 49-61, Oct. 1994.

Feng, X., Chien, P.-H., Wang, Y., Patel, S., Wang, P., Liu, H., Immediato-Scuotto, M., Hu, Y.-Y. (2020). Enhanced ion conduction by enforcing structural disorder in Li-deficient argyrodites li6-xps5-xcl1+x. Energy Storage Materials, 30, 67-73. https://doi.org/10.1016/j.ensm.2020.04.042.

Gamon, J., Dyer, M. S., Duff, B. B., Vasylenko, A., Daniels, L. M., Zanella, M., Gaultois, M. W., Blanc, F., Claridge, J. B., Rosseinsky, M. J. (2021). Li4.3als3.3cl0.7: A sulfide-chloride lithium ion conductor with highly disordered structure and increased conductivity. Chemistry of Materials, 33(22), 8733-8744. https://doi.org/10.1021/acs.chemmater.1c02751.

Garcia-Barriocanal, J., Rivera-Calzada, A., Varela, M., Sefrioui, Z., Díaz-Guillén, M.R., Moreno, K.J., Díaz-Guillén, J. A., Iborra, E., Fuentes, A.F., Pennycook, S.J., Leon, C. and Santamaria, J. (2009), Tailoring Disorder and Dimensionality: Strategies for Improved Solid Oxide Fuel Cell Electrolytes. ChemPhysChem, 10: 1003-1011. https://doi.org/10.1002/cphc.200800691.

(56) References Cited

OTHER PUBLICATIONS

Hattori et al., "Change in Conductivity of Yttria Stabilized Zirconia," Journal of the Japan Society of Powder and Powder Metallurgy, vol. 50, No. 4, pp. 297-301, 2003.
Hu, N., Khan, M., Wang, Y., Song, X., Lin, C., Chang, C., Zeng, Y. (2017). Effect of microstructure on the thermal conductivity of plasma sprayed Y2O3 stabilized zirconia (8% YSZ). Coatings, 7(11), 198. https://doi.org/10.3390/coatings7110198.
I. R. Gibson, G. P. Dransfield, and J. T. S. Irvine, "Sinterability of commercial 8 mol% yttriastabilized zirconia powders and the effect of sintered density on the ionic conductivity," Journal of Materials Science, vol. 33, No. 17, pp. 4297-4305, Sep. 1998.
ISR for PCT/US23/24243 dated Sep. 8, 2023.
O. H. Kwon et al., "Investigation of the electrical conductivity of sintered monoclinic zirconia (ZrO2)," Ceramics International, vol. 43, No. 11, pp. 8236-8245, Aug. 2017.
Tu, Z., Tian, Y., Liu, M., Jin, B., Akbar, M., Mushtaq, N., Wang, X., Dong, W., Wang, B., Xia, C. (2021). Remarkable ionic conductivity in a LZO-SDC composite for low-temperature solid oxide fuel cells. Nanomaterials, 11 (9), 2277. https://doi.org/10.3390/nano11092277.
Wohlmuth, D., Epp, V., Bottke, P., Hanzu, I., Bitschnau, B., Letofsky-Papst, I., Kriechbaum, M., Amenitsch, H., Hofer, F., Wilkening, M. (2014). Order vs. disorder—a huge increase in ionic conductivity of nanocrystalline LiAlO_2 embedded in an amorphous-like matrix of lithium aluminate. J. Mater. Chem. A, 2(47), 20295-20306. https://doi.org/10.1039/c4ta02923b.
Y.-Z. Xing, C.-J. Li, Q. Zhang, C.-X. Li, and G.-J. Yang, "Influence of Microstructure on the Ionic Conductivity of Plasma-Sprayed Yttria-Stabilized Zirconia Deposits," Journal of the American Ceramic Society, vol. 91, No. 12, pp. 3931-3936, 2008.
Bragg, W. L. and Williams, E. J., "The effect of thermal agitation on atomic arrangement in alloys," Proceedings of the Royal Society of London, Series A, Containing Papers of a Mathematical and Physical Character, vol. 145, pp. 699-730, 1934.
Morgan, RS., "Reciprocal ribose interactions: A possible structural motif in and between RNA'S," Biosystems, vol. 5, 1973, pp. 95-97.
Laks, D.B., Wei, S.-H., and Zunger, A., "Evolution of alloy properties with long-range order," Phys. Rev. Lett., vol. 69, pp. 3766-3770 (1992).
Wei, S., Laks, D.B., and Zunger, A., "Dependence of the optical properties of semiconductor alloys on the degree of long-range order," Appl. Phys. Lett., vol. 62, pp. 1937-1939 (1993).
Ma, J., Deng, H.-X., Luo, J.-W., and Wei, S.-H., "Origin of the failed ensemble average rule for the band gaps of disordered nonisovalent semiconductor alloys," Phys. Rev. B 90, 115201 (2014).
Nakatsuka, S. and Nose, Y., "Order-Disorder Phenomena and Their Effects on Bandgap in ZnSnP2," J. Phys. Chem. C 121, 1040 (2017).
Ryan, M., Peterson, M.W., Williamson, D., Frey, J.S., Maciel, G.E., and Parkinson, B., "Metal site disorder in zinc tin phosphide," J. Mater. Res. 2, 528 (1987).
St-Jean, P., Seryogin, G., and Francoeur, S., "Band gap of sphalerite and chalcopyrite phases of epitaxial ZnSnP 2 ZnSnP2," Appl. Phys. Lett. 96, 231913 (2010).
Makin, R.A. and Durbin, S.M., "Structural Motifs, Disorder, and the Efficacy of Viral Vaccines, " bioRxiv 10.1101/2020.06.08.139907 (2020).
Cowley, J.M., "X-Ray Measurement of Order in Single Crystals of Cu3Au," J. Appl. Phys., vol. 21, 24 (1950).
Feldberg, N., Aldous, J., Linhart, W., Phillips, L., Durose, K., Stampe, P., Kennedy, R., Scanlon, D., Vardar, G., Field, R., III et al., "Growth, disorder, and physical properties of ZnSnN2," Appl. Phys. Lett. 103, 042109 (2013) doi: 10.1063/1.4816438.
Keating, D. T. and Warren, B. E., "Long-Range Order in Beta-Brass and Cu3Au," J. Appl. Phys. 22, 286 (1951 ).
Senabulya, N., Feldberg, N., Makin, RA., Yang, Y., Shi, G., Jones, C.M., Kioupakis, E., Mathis, J., Clarke, R., and Durbin, S.M., "Stabilization of orthorhombic phase in single-crystal ZnSnN2 films," AIP Adv. 6, 075019 (2016) doi: 10.1063/1.4960109.
Bragg W. L. et al., "The effect of thermal agitation on atomic arrangement in alloys—II," Proceedings of the Royal Society of London, Series A, Mathematical and Physical Sciences, vol. 151, pp. 540, Oct. 1, 1935, <https://doi.org/10.1098/rspa.1935.0165>.
Achiele, K.P., "Paul Klee's 'Rhythmisches': A Recapitulation of the Bauhaus Years," Zeitschrift fur Kunstgeschichte 57, 75 (1994).
Anderson, C., Zucker, F., and Steitz, T., "Space-filling models of kinase clefts and conformation changes," Science 204, 375 (1979).
Bhuiyan, A.G., Sugita, K., Kasashima, K., Hashimoto, A., Yamamoto, A., and Davydov, V.Y., "Single-crystalline InN films with an absorption edge between 0.7 and 2 eV grown using different techniques and evidence of the actual band gap energy," Applied Physics Letters, 83, 4788 (2003).
Bleckley, S. and Schroeder, S.J., "Incorporating global features of rna motifs in predictions for an ensemble of secondary structures for encapsidated ms2 bacteriophage rna," RNA 18, 1309 (2012).
Burstein, E., "Anomalous Optical Absorption Limit in InSb," Phys. Rev. 93, 632 (1954).
Cho, S.-H., "Effects of growth temperature on the properties of ZnO thin films grown by radio-frequency magnetron , sputtering," Transactions on Electrical and Electronic Materials 10, 185 (2009).
Cray, C. and Rowley, G., "Chinese and Western Composition: A Conversation between an Artist and an Art Historian," College Art Journal 15, 6 (1955).
Dimroth et al., "Wafer Bonded Four-junction GaInP/GaAs//GaInAsP/GaInAs Concentrator Solar Cells with 44.7% Efficiency," Progress in Pholovoltaics: Research and Applications, Prog. Pholovolt: Res. Appl. 2014, vol. 22, published Jan. 13, 2014, pp. 277-282, https://doi.org/10.1002/pip.2475.
Dixon, J.R., and Bis, R.F., "Band Inversion and the Electrical Properties of PbxSn1-xTe," Phys. Rev. 176, 942 (1968).
Feldberg et al., "ZnSnN2: A New Earth-Abundant Element Semiconductor for Solar Cells," Department of Physics, University at Buffalo, The State University of New York, Buffalo, NY, USA, IEEE, 2011 978-1-4673-0066-7/12, pp. J02524-002527 (4 pages).
Haddad, D.B., Thakur, J.S., Naik, V.M., Aun Er, G.W., Naik, R., and Wenger, L.E., "Optical Band Gap Measurements of InN Films in the Strong Degeneracy Limit," MRS Proceedings 743, L 11.22 (2002).
Holonyak, N. and Bevacqua, S.F., "Coherent (Visible) Light Emission From Ga(As1xPx) Junctions," Applied Physics Letters 1, 82 (1962).
Ichimiya, A., Cohen, P.I., and Cohen, P.I., "Reflection high-energy electron diffraction," Cambridge University Dress (2004).
Inushima, T., Mamutin, V., Vekshin, V., Ivanov, S., Sakon, T., Motokawa, M., and Ohoya, S., "Physical properties of InN with the band gap energy of 1.1ev," Journal of Crystal Growth 227-228, 481 (2001).
Janssen, B., Burgoyne, J.A., and Honing, H., "Predicting Variation of Folk Songs: A Corpus Analysis Study on the Memorability of Melodies," Frontiers in Psychology 8, 621 (2017).
Ji, X.H., Lau, S.P., Yang, HY., and Zhang, Q.Y., "Thin Solid Films" 515, 4619 (2007).
Kronig, R.D.L., Penney, W.G., and Fowler, R.H., "Quantum mechanics of electrons in crystal lattices," Proceedings of the Royal Society of London, Series A, Containing Papers of a Mathematical and Physical Character 130,499 (1931).
Kurimoto, E., Hangyo, M., Harisma, H., Yoshimoto, M., Yamaguchi, T., Araki, T., Nanishi, Y., and Kisoda, K., "Spectroscopic observation of oxidation process in InN," Applied Physics Letters 84, 212 (2004).
Lacklison, D.E., Orton, J.W., Harrison, I., Cheng, T.S., Jenkins, L.C., Foxon, C.T., and Hooper, S.E., "Band gap of GaN films grown by molecular-beam epitaxy on GaAs and GaP subsrtates," Journal of Applied Physics 78, 1838 (1995).
Makin et al., "Order Parameter and Band Gap of ZnSnN2," Department of Electrical and Computer Engineering, Nestern Michigan University, Kalamazoo, Michigan, 978-1-5386-8529-7/18, 2018, IEEE, pp. 3865-3868.
Mang, A., Reimann, K., and Robenacke, S., "Band gaps, crystal-field splitting, spin-orbit coupling, and exciton binding energies in ZnO under hydrostatic pressure," Solid State Communications 94, 251 (1995).

(56) References Cited

OTHER PUBLICATIONS

Moss, T.S., "The interpretation of the properties of indium antimonide," Proceedings of the Physical Society, Section B 67, 775 (1954).

Ruhle, S., "Tabulated Values of the Shockley-Queisser Limit for Single Junction Solar Cells," Solar Energy Consulting, vol. 130, 2016, pp. 139-147, <http://dx.doi.org/10.1016/j.solener.2016.02.15>.

Slotboom, J., and De Graaff, H., "Measurements of bandgap narrowing in Si bipolar transistors," Solid-State Electronics 19, 857 (1976).

Walukiewicz, W., Li, S., Wu, J., Yu, K., Ager, J., Haller, E., Lu, H., and Schaff, W.J., "Optical properties and electronic structure of InN and In-rich group III-nitride alloys," Journal of Crystal Growth 269, 119 (2004).

Bragg, W. L. and Williams, E. J., "The effect of thermal agitation on atomic arrangement in alloys—III," Proceedings of the Royal Society of London, Series A, Mathematical and Physical Sciences, vol. 152, Oct. 15, 1935, pp. 231-252.

Ager, J.W., Walukiewicz, W., Shan, W., Yu, K.M., Li, S.X., Haller, E.E., Lu, H., and Schaff, W.J., "Multiphonon resonance Raman scattering in $In_xGa_{1-x}N$," Phys. Rev. B 72, 155204 (2005).

Arnaudov, B., Paskova, T., Paskov, P.P., Magnusson, B., Valcheva, E., Monemar, B., Lu, H., Schaff W.J., Amano, H., and Akasaki, I., "Energy position of near-band-edge emission spectra of InN epitaxial layers with different doping levels," Phys. Rev. B 69, 115216 (2004).

Berggren, K.F. and Sernelius, B.E., "Band-gap narrowing in heavily doped many-valley semiconductors," Phys. Rev. B 24, 1971 (1981).

Brodsky, M.H. and Title, R.S., "Electron Spin Resonance in Amorphous Silicon, Germanium, and Silicon Carbide," Phys. Rev. Lett. 23, 581 (1969).

Cuong, T.V., Pham, V.H., Tran, Q.T., Hahn, S.H., Chung, J.S., Shin, E.W., and Kim, E.J., "Photoluminescence and Raman studies of graphene thin films prepared by reduction of graphene oxide," Materials Letters 64, 399 (2010).

Davydov, V.Y., Klochikhin, A.A., Emtsev, V.V., Smirnov, A.N., Goncharuk, I.N., Sakharov, AV., Kurdyukov, D.A., Baidakova, M.V., Vekshin, V.A., Ivanov, S.V., Aderhold, J., Graul, J., Hashimoto, A., and Yamamoto, A., "Photoluminescence and Raman study of hexagonal InN and In-rich InGaN alloys," Physica Status Solidi (b) 240, 425 (2003).

D'Innocenzo, V., Srimath Kandada, A.R., De Bastiani, M., Gandini, M., and Petrozza, A., "Tuning the Light Emission Properties by Band Gap Engineering in Hybrid Lead Halide Perovskite," J. Am. Chem. Soc. 136, 17730 2014).

Dixit, V., Rodrigues, B., Bhat, H., Venkataraghavan, R., Chandrasekaran, K., and Arora, B., "Growth of InSb epitaxial layers on GaAs (001) substrates of LPE and their characterizations," Journal of Crystal Growth 235, 154 (2002).

Fogal, B., O'Leary, S., Lockwood, D., Baribeau, J.-M., Noel, M., and Zwinkels, J., "Disorder and the optical properties of amorphous silicon grown by molecular beam epitaxy," Solid State Communications 120, 429 2001).

Geim, A.K. and Novoselov, K.S., "The rise of graphene," Nature Matter 6, 183 (2007).

Guo, Q., Kusunoki, Y., Ding, Y., Tanaka, T., and Nishio, M., "Properties of InGaN Films Grown by Reactive Sputtering," Japanese Journal of Applied Physics 49, 081203 (2010).

Kalt, H. and Rinker, M., "Band-gap renormalization in semiconductors with multiple inequivalent valleys," Phys. Rev. B 45, 1139 (1992).

Kong, L., Liu, G., Gong, J., Hu, Q., Schaller, R.D., Dera, P., Zhang, D., Liu, Z., Yang, W., Zhu, K., Tang, Y., Wang, C., Wei, S.-H., Xu, T., and Mao, H.-K., "Simultaneous band-gap narrowing and carrier-lifetime prolongation of organic-inorganic trihalide perovskites," Proceedings of the National Academy of Sciences 113, 8910 (2016), https://www.pnas.org/content/113/32/8910.full.pdf.

Laaziri, K., Kycia, S., Roorda, S., Chicoine, M., Robertson, J.L., Wang, J., and Moss, S.C., "High Resolution Radial Distribution Function of Pure Amorphous Silicon," Phys. Rev. Lett. 82, 3460 (1999).

Lockwood, D.J. and Wang, A.G., "Quantum confinement induced photoluminescence in porous silicon," Solid State Communications 94, 905 (1995).

Makin, Robert A., Quantification and Influence of Cation Sublattice Disorder in Ternary Materials With Specific Application to $SnSnN_2$, Western Michigan University, 2019.

Manser, J.S. and Kamat, P.V., "Band filling with free charge carriers in organometal halide perovskites," Nature Photonics 8, 737 (2014).

Meher, S.R., Biju, K.P., and Jain, M.K., "Raman spectroscopic investigation of phase separation and compositional fluctuations in nanocrystalline $InGa_{1-x}N$ thin films prepared by modified activated reactive evaporation," Physica Status Solidi (a) 208, 2655 (2011).

Perez, J.M., Villalobos, J., McNeill, P., Prasad, J., Cheek, R., Kelber, J., Estrera, J.P., Stevens, P. D., and Glosser, R., "Direct evidence for the amorphous silicon phase in visible photoluminescent porous silicon," Applied Physics Letters 61,563 (1992).

Potts, R.B., "Some generalized order-disorder transformations," Mathematical Proceedings of the Cambridge Philosophical Society 48, 106 (1952).

Prokes, S.M. and Glembocki, O.J., "Role of interfacial oxide-related defects in the red-light emission in porous silicon," Phys. Rev. B 49, 2238 (1994).

Robins, L., Paul, A., Parker, C., Roberts, J., Bedair, S., Piner., E., and El-Masry, N., "Optical Absorption Raman, and Photoluminescence Excitation Spectroscopy of Inhomogeneous InGaN Films," MRS Proceedings 537, 33.22 (1998).

Senthilkumar, V., Venkatachalam, S., Viswanathan, C., Gopal, S., Narayandass, S.K., Mangalaraj, D., Wilson, K.C., and Vijayakumar, K.P., "Influence of substrate temperature on the properties of , vacuum evaporated InSb films," Crystal Research and Technology 40, 573 (2005).

Sokolov, A.P., Shebanin, A.P., Golikova, O.A., and Mezdrogina, M.M., "Structural disorder and optical gap fluctuations in amorphous silicon," Journal of Physics: Condensed Matter 3, 9887 (1991).

Sood, A.K., Jayaram, K., and Muthu, D.V.S., "Raman and high-pressure photoluminescence studies on porous silicon," Journal of Applied Physics 72, 4963 (1992).

Tanino, H., Kuprin, A., Deai, H., and Koshida, N., "Raman study of free-standing porous silicon," Phys. Rev. B 63, 1937 (1996).

Tsu, R., Shen, H., and Dutta, M., "Correlation of Raman and photoluminescence spectra of porous silicon," Applied Physics Letters 60, 112 (1992).

Ising E:, "Beitrag zur Theorie des Ferromagnetismus," Zeitschrift fOr Physik 32 (1924), 6 pages.

Warren, 8., "X-Ray Diffraction," Dover Books on Physics (Dover, New York, 2012), 74 pages.

European Commission, DG Enterprise and Industry, "Critical raw materials for the EU Report of the Ad-hoc Working Group on defining critical raw materials", European Commission, Jul. 30, 2010, 84 pages.

Fateley et al., "Practical Methods for Selection Rules" (pp. 1-42 of this book originally appeared as "Infrared and Raman Selection Rules for Molecular and Lattice Vibrations: The Correlation Method," Wiley-Interscience, New York (1972), 33 pages.

Ichimiya, A. and Cohen, P., "Kinematic Electron Diffraction," Cambridge University Press, Cambridge, England, 2004, 23 pages.

Ising et al., "The Fate of Ernst Ising and the Fate of his Model," Jun. 6, 2017, 46 pages.

Kochmanski, Martin S. Note on the E. Ising's Paper, Bitrag Zur Theorie Des Ferromagnetismus, Feb. 13, 2008, 4 pages.

Makin et al., "Supplementary Information for Alloy-Free Band Gap Tuning Across the Visible Spectrum," at least as early as Jun. 27, 2019, 6 pages.

Wikipedia, "Ising model," Last edited on Apr. 4, 2022, 29 pages.

Zhao, Q., Potter, C.S., Carragher, B., Lander, G., Sworen, J., Towne, V. et al., "Characterization of virus-like particles in Gardasil by cryo transmission electron microscopy," Human Vaccines & Immunotherapeutics, Mar. 2014, 10(3), pp. 734-739.

(56) References Cited

OTHER PUBLICATIONS

Boigard, H., Alimova, A., Martin, G.R, Katz, A., Gottlieb, P., Galarza, J.M., "Zika virus-like particle (VLP) based vaccine," PLOS Negl. Trop. Dis., May 2017, 11(5):e0005608.
Bonnez, W. et al., "Isolation and propagation of human papillomavirus type 16 in human xenografts implanted in the severe combined immunodeficiency mouse," J_ Virol., 72, pp. 5256-5261, 1998.
Carter, C.B. and Williams, D.B. (Eds.), "Transmission Electron Microscopy: Diffraction, Imaging, and Spectrometry," Springer International Publishing, 2016, Available from: https://www_springer.com/gp/book/9783319266497.
CDC, "H1N1 Flu," Images of the H1N1 Influenza Virus, at least as early as May 6, 2019, Available from: https://www.cdc.gov/h1n1flu/images_htm?s_cid=cs_001.
Chan, W., Zhou, H., Kemble, G., Jin, H., "The cold adapted and temperature sensitive influenza A/Ann Arbor/6/60 virus, the master donor virus for live attenuated influenza vaccines, has multiple defects in replication at the restrictive temperature," Virology, Oct. 25, 2008, vol. 380(2), pp. 304-311.
Chua, K., Mee Hoo Wong, E., Cropp, B., Hyatt, A., "Role of electron microscopy in Nipah virus outbreak investigation iind control," The Medical Journal of Malaysia, Jun. 2, 2007, vol. 62, pp. 139-142.
Cohen, K. W. and Frahm, N., "Current views on the potential for development of a HIV vaccine," Expert Opinion Biological Therapy, 17:3, pp. 295-303, 2017.
Cullity, B.D., "Elements of x-ray diffraction," Addison-Wesley Publishing Company, Inc., 1978.
Cunha, A.J.L.A. da, de Magalhaes-Barbosa, M.C., Lima-Setta, F., Medronho, R. de A., Prata-Barbosa, A., "Microcephaly Case Fatality Rate Associated with Zika Virus Infection in Brazil: Current Estimates," Pediatr. Infect. Dis. J., 2017, vol. 36(5), pp. 528-530.
Eckert, A., Higgins, D., MAMS, CDC, "Illustration of a Coronavirus," Public Health Image Library, 2020, Available from: https://phil.cdc.gov/details .aspx?pid=23312.
Fibriansah, G., Ng, T-S., Kostyuchenko, V.A., Lee, J., Lee, S., Wang, J. et al., "Structural Changes in Dengue Virus When Exposed to a Temperature of 37° C," Journal of Virology, Jul. 2013, vol. 87(13), pp. 7585-7592.
Gels, T., Schagger, H. and von Jagow, G., "Tricine-sodium dodecyl sulfate-polyacrylamide gel electrophoresis for the separation of proteins in the range from 1 to 100 kDa," Anal. Biochem., vol. 166, pp. 368-379, 1987.
Hierholzer, J.C. and Kabara, J. J., "In Vitro Effects of Monolaurin Compounds on Enveloped RNA and DNA Viruses," Journal of Food Safety, vol. 4, pp. 1-12, 1982.
Hyatt, A.D., Zaki, S.R., Goldsmith, C.S., Wise, T.G., Hengstberger, S.G., "Ultrastructure of Hendra virus and Nipah virus within cultured cells and host animals," Microbes and Infection, Apr. 2001, 1 ;3(4), pp. 297-306.
Jordan, D., CDC, "3D rendering of a whole influenza (flu) virus," Public Health Image Library, 2019, Available from: https://phil.cdc.gov/Details.aspx?pid=23227.
Kenmoe, S., Demanou, M., Bigna, J.J., Nde Kengne, C., Fatawou Modiyinji, A., Simo, F.B.N et al., "Case fatality rate and risk factors for Nipah virus encephalitis: A systematic review and meta-analysis," J. Clin. Virol., 2019, vol. 117, pp. 19-26.
Landau, L.D., "On the Theory of Phase Transitions," Zh. Esksp. Teor. Fiz. 7, pp. 19-32, 1937.
Monaghan, P., Green, D., Pallister, J., Klein, R., White, J., Williams, C. et al., "Detailed morphological characterisation of Hendra virus infection of different cell types using super-resolution and conventional imaging," Virology Journal, Nov. 27, 2014, 11:200, pp. 1-12.
Monath, T.P., "Treatment of yellow fever," Antiviral Research, vol. 78, pp. 116-124, 2008.
National Center for Emerging and Zoonotic Infectious Diseases, "Hendra Virus Disease (HeV)," Feb. 2021, Available from: https://www.cdc.gov/vhf/hendra/pdf/factsheet.pdf.

NIAID, "1918 H1N1 Virus Particles," 2018, Available from: https://www.flickr.com/photos/niaid/30012820867/.
NIAID, "Zika Virus," 2016, Available from: https://www.flickr.com/photos/niaid/27023892862/.
Nickol, M.E. and Kindrachuk, J., "A year of terror and a century of reflection: perspectives on the great influenza pandemic of 1918-1919," BMC Infectious Diseases, Feb. 6, 2019, vol. 19:117, 10 pages.
Harding, C., Pompei, F., Bordonaro, S.F., McGillicuddy, D.C., Burmistrov, D., Sanchez, L.D., "The daily, weekly, and seasonal cycles of body temperature analyzed at large scale," Chronobiology International, Dec. 2, 2019, vol. 36(12), pp. 1646-1657.
Jaroenjittichai, A.P. and Lambrecht, W.R.L., "Electronic band structure of Mg-IV-N2 compounds in the quasiparticle-self-consistent GW approximation," Phys. Rev. B 94, 125201 (2016).
Kanchiang, K., Cheiwchanchamnangij, T., Laosiritawron, Y., Pramchu, S., and Jaroenjittichai, A.P., "Structural and electronic properites of MgGexSn(1-x)N2 semiconductors: The density functional theory investigation," Journal of Physics: Conference Series, 1144, 012149 (2018).
Kawamura, F., Yamada, N., Imai, M., and Taniguchi, T., "Synthesis of ZnSnN2 crystals via a high-pressure metathesis reaction," Cryst. Res_ & Technol., vol. 51,220 (2016).
Kresse, G, and Furthmuller, J., "Efficiency of ab-initio total energy calculations for metals and semiconductors using a plane-wave basis set," Comput. Mater. Sci. 6, 15 (1996).
Kresse, G. and Furthmuller, J., "Efficient iterative schemes for ab initio total-energy calculations using a plane-wave basis set," Phys. Rev. B 54, 11169 (1996).
Kresse, G. and Hafner, J., "Ab initio molecular dynamics for liquid metals," Phys. Rev. B 47, 558 (1993).
Kresse, G. and Hafner, J., "Ab initio molecular dynamics simulation of the liquid-metal-amorphous-semiconductor transition in germanium," Phys. Rev. B 49, 14251 (1994).
Kresse, G. and Joubert, D., "From ultrasoft pseudopotentials to the projector augmented-wave method," Phys. Rev. B. f.101_ 59, 1758-1775 (1999).
Lahourcade, L., Coronel, N.C., Delaney, K.I., Shukla, S.K, Spaldin, N.A., and Atwater, H.A., "Structural and Optoelectronic Characterization of RF sputtered ZnSnN(2)," Advanced Materials, 25, 2562 (2013).
Lebens-Higgins, Z., Scanlon, D.O., Paik, H., Sallis, S., Nie, Y., Uchida, M., Quackenbush, N.F., Wahila, M.J., Sterbinsky, G.E., Arena, D.A., Woicik, J.C., Schlom, D.G., and Piper, L.F.J., "Direct Observation of Eletrostatically Driven Band Gap Renormalization in a Degenerate Perovskite Transparent Conducting Oxide," Phys. Rev. Lett. 116, 024602 (2016).
Lin, Yu-Jen et al., "A Rapid and Sensitive Early Diagnosis of Influenza Virus Subtype via Surface Enhanced Raman Scattering," Journal of Biosensors & Bioelectronics [Internet], 2014 [cited May 5, 2020], vol. 05(02), Available from: https://www.omicsonline.org/open-access/a-rapid-and-sensitive-early-diagnosis-of-influenza-virus-subtype-via-surface-enhanced-raman-scattering-2155-6210.1000150.php?aid=27090.
Liu, H., Li, Z., Cao, Y., Cui, Y., Yang, X., Meng Z. et al., "Effect of chondrocyte mitochondrial dysfunction on cartilage degeneration: A possible pathway for osteoarthritis pathology at the subcellular level," Molecular Medicine Reports, bet. 1, 2019, vol. 20(4), pp. 3308-3316.
Makin, R. A., Senabulya, N., Mathis, J., Feldberg, N., Miska, P., Clarke, R., and Durbin, S. M., "Growth of Ordered and Disordered ZnSnN2," J. Vac. Sci. Technol. B 35, 02B116 (2017).
Momma, K. and Izumi, F., "Vesta 3 for three-dimensional visualization of crystal, volumetric and morphology data," J. Appl. Crystallogr. 44, 1272 (2011).
NIAID, "MERS-CoV Particles, " 2013, Available from: https://www.flickr.com/photos/niaid/8618697423/.
NIAID, "Novel Coronavirus SARS-CoV-2, 2020," Available from: https://www.flickr.com/photos/niaid/49641177636/.
Nussbaum-Krammer, C.I., Park, K-W, Li, L., Melki, R., Morimoto, RI., "Spreading of a Prion Domain from Cell-to-Cell Dy Vesicular Transport in Caenorhabditis elegans," PLOS Genetics, Mar. 28, 2013, vol. 9(3), e1003351.

(56) References Cited

OTHER PUBLICATIONS

Ober, J.A., "Mineral Commodity Summaries 2016," technical report, Reston, VA (2016).
Perdew, J.S., Burke, K., and Emzerhof, M., "Generalized Gradient Approximation Made Simple," Phys. Rev. Lett., vol. 77, pp. 3865-3868 (1996).
Peshek, T. J., Paudel, T. R., Kash, K., and Lambrecht, W.R.L., "Vibrational modes in ZnGeN2: Raman study and Theory," Phys. Rev. B 77, 235213 (2008).
Qin, R., Cao, H., Liang, L., Xie, Y., Zhuge, F., Zhang, H., Gao, J. Javaid, K., Liu, C., and Sun, W., "Semiconducting ZnSnN2 thin films for Si/ZnSnN2 p-n junctions," Appl. Phys, Lett., col. 108, 142104 (2016).
Quayle, P.T., Junno, G.T., He, K., Blanton, E.W., Shan, J., and Kash, K., "Vapor-liquid-solid synthesis of ZnSnN2," Phys. Status Solidi B, vol. 254, 1600718 (2017).
R. Jaffe, J. Price, M. Hitzman, and F. Slakey, "The Back Page, Energy Critical Elements," APS News, vol. 20, No. 4 (2011).
Reid, A.H., Taubenberger, J.K., Fanning, T.G., "The 1918 Spanish influenza: integrating history and biology," Microbes Infection, Jan. 2001, vol. 3(1), pp. 81-87.
Sarma, D.D., Shanthi, N., Barman, S.R., Hamada, N., Sawada, H., and Terakura, K., "Band Theory for Ground-State Properties and Exication Spectra of Perovskite LaMO3 ( M=Mn, Fe, Co, Ni)," Phys. Rev. Lett. 75, 1126 (1995).
Science Source, "SARS Coronavirus," TEM, at least as early as May 6, 2019, Available from: https://www.sciencesource.com/CS.aspx?VP3=SearchResult&ITEMID=SS2760539&POPUPPN= 1 &PopupID=20PEBMGD5GLU.
Sebastian, M., Peters, J.A., Stoumpos, C.C., Im, J., Kostina, S.S., Liu, S., Kanatzidis, M.G., Freeman, A.J. and Wessels, B.B., "Exitonic emissions and above-band-gap luminescence in the single-crystal perovskite Semiconductors CsPbBr3 and CsPbCl3m," Phys. Rev. B 92, 235210 (2015).
Shen, T.Y., Mitra, S.S., Prask, H. and Trevino, S.F., "Order-disorder phenomenon in sodium nitrate studied by low-frequency Raman scattering," Phys. Rev. B 12, 4530 (1975).
Upton, M.H., Choi, Y., Park, H., Liu, J., Meyers, D., Chakhalian, J., Middey, S., Kim, J.-W., and Ryan, "Novel Electronic Behavior Driving NdNiO3 Metal-Insulator Transition," P.J., Phys. Rev. Lett, 115, 036401 (2015).
Vidal, J., Trani, F., Bruneval, F., Marques, M.A.L., and Botti, S., "Effects of Electronic and Lattice Polarization on the Band Structure of Delafossite Transparent Conductive Oxides, "Phys, Rev. Lett. 104, 136401 (2010).
Wei, S.-H., Ferreira, L.B., and Zunger, A., "First-principles calculation of the order-disorder transition in chalcopyrite semiconductors," Phys. Rev. B, vol. 45, pp. 2533-2536 (1992).
Wilchinsky, Z. W., "X-Ray Measurement of Order in the Alloy Cu3Au," J. Appl. Phys. 15, 806 (1944).
Yan, X.-W., Gao, M., Lu, Z.-Y., and Xiang, T., "Electronic Structures and Magnetic Order of Ordered-Fe-Vacancy Ternary Iron Selenides TIFe1.5Se2 and AFe1.5Se2 (A=K, Rb, or Cs)," Phys. Rev, Lett, 106, 087005 (2011).
Makin, R. A. et al., "Quantitative Disorder Analysis and Particle Removal Efficiency of Polypropylene-Based Masks," Dept. of Computer Eng., Western Michigan University, Kalamazoo, MI, Dec. 1, 2020, pp. 3853-2861, DOI: 10.1557/adv.2020.346.
Agranovski, I. E. et al., "Enhancement of the performance of low-efficiency HVAC filters due to continuous unipolar ion emission," Aerosol Science and Technology 40, 2006, pp. 963-968.
Auriemma, F. et al., "Structural Disorder in the a Form of Isotactic Polypropylene," Macromolecules 33, 8764 Oct. 1, 2000.
De Rosa, C. et al., "Polymorphism in polymers: A tool to tailor material's properties," Polymer Crystallization, 2020, 3: e10101.
G. Allegra, P. Corrandini and P. Ganis, "A model of the chain conformation of an isotactic vinyl polymer having bpitcally active side groups," Macromolecular Chemistry and Physics, vol. 90, 1966, pp. 60-65.
H. Li, W. Wu, M.M. Bubakir, H. Chen, X. Zhong, Z. Liu, Y. Ding, and W. Yang, J., "Polypropylene fibers fabricated via a needleless melt-electrospinning device for marine oil-spill cleanup," Appl. Polymer Science, vol. 131, 2014.
Hiejima, Y. et al., "Investigation of the Molecular Mechanisms of Melting and Crystallization of Isotactic Polypropylene by in Situ Raman Spectroscopy," Macromolecules, vol. 50, 2017, pp. 5867-5876.
Hikosaka, M. et al., "The order of the molecular chains in isotactic polypropylene crystals," Polymer Journal, vol. 5, 1973, pp. 111-127.
Ho, R.-M. et al., "Helical architectures from self-assembly of chiral polymers and block copolymers," Progress in Polymer Science, vol. 36, 2011, pp. 376-453.
Lee, S. et al., "Reusable Polybenzimidazole Nanofiber Membrane Filter for Highly Breathable PM2.5 Dust Proof Mask", ACS Applied Materials & Interfaces 11, Jan. 7, 2019, pp. 2750-2757.
Liu, J. et al., "Low resistance bicomponent spunbond materials for fresh air filtration with ultra-high dust holding capacity," RSC Advances 7, 2017, pp. 43879-43887.
Principles of Equilibrium Statistical Mechanics, John Wiley & Sons, Ltd., 2005, Chapter 12—Mean-Field Theory III: Landau Formulation, pp. 432-469.
R. Ishidate, A. J. Markvoort, K. Maeda, and E. Yashima, "Unexpectedly Strong Chiral Amplification of Chiral/Achiral and Chiral/Chiral Copolymers of Biphenylylacetylenes and Further Enhancement/Inversion and Memory of the Macromolecular Helicity," J. Am. Chem. Soc. 141, 2019, pp. 7605-7614.
T.M. Birshtein and P.M. Luisi, "Conformation of optically active isotactic macromolecules," Vysokomol. Soedin. Polymer Science, vol. 6, 1238 (1964).
Aghanim, N. et al, 2018 results—I. Overview and the cosmological legacy of Planck, Astronomy & Astrophysics 641, A1 (2020), publisher: EDP Sciences, 56 pages.
Aghanim, N.; "Planck 2018 results—VI. Cosmological parameters," Astronomy & Astrophysics 641, A6 (2020), publisher: EDP Sciences.
Pankrac, J., Klein, K., McKay, P.F., King, D.F.L., Bain, K., Knapp, J. et al., "A heterogeneous human immunodeficiency virus-like particle (VLP) formulation produced by a novel vector system," NPJ Vaccines, Jan. 19, 2018, 3(1), pp. 1-10.
Rerks-Ngarm, S., Pitisuttithum, P., Nitayaphan, S., Kaewkungwal, J., Chiu, J., Paris, R. et al., "Vaccination with ALVAC and AIDSVAX to prevent HIV-1 infection in Thailand," The New England Journal of Medicine, Dec. 3, 2009, vol. 361 (23), pp. 2209-2220.
Salinas, J.D. and Steiner, M.L., "West Nile Virus: Practice Essentials," Pathophysiology, Epidemiology, Medscape, Apr. 23, 2020 [cited May 5, 2020], Available from: https://emedicine.medscape.com/article/312210-overview.
Schiller, J. and Chackerian, B., "Why HIV Virions Have Low Numbers of Envelope Spikes: Implications for Vaccine Development," PLOS Pathog [Internet), Aug. 7, 2014 [cited May 5, 2020), vol. 10(8), Available from: https://www.ncbi.nlm.nih.gov/pmc/articles/PMC4125284/.
Science Source, "H3N2, Hong Kong Flu Virus," TEM, at least as early as May 6, 2019, Available from: https://www.sciencesource.com/CS.aspx?VP3=SearchResult&ITEMID=SS2760545.
Science Source, "H5N1, Influenza A, Avian Flu Virus," TEM, at least as early as May 6, 2019, Available from: https://www.sciencesource.com/CS.aspx?VP3=SearchResult&VBID= 20PESQLF1 KBWQ&SM LS= 1 &RW=1920&RH=966#/.
Science Source, "HIV-1, Human Immunodeficiency Virus," TEM, at least as early as May 6, 2019, Available from: https://www.sciencesource.com/archive/HIV-1--Human-Immunodeficiency-Virus-TEM-SS2760525.html.
Science Source, "West Nile Virus," TEM, at least as early as May 6, 2019, Available from: https://www.sciencesource.com/archive/West-Nile-Virus-TEM-SS28384 79.html.
Smith, G.E., Sun, X., Bai, Y., Liu, Y.V., Massare, M.J., Pearce, M.B. et al., "Neuraminidase-based recombinant virus-like particles protect against lethal avian influenza A(H5N1) virus infection in ferrets," Virology, 2017, pp. 509:90-97.
Taubenberger, J.K. and Morens, D.M., "1918 Influenza: the Mother of All Pandemics," Emerging Infectious Diseases Journal—CDC,

(56) References Cited

OTHER PUBLICATIONS vol. 12, No. 1, Jan. 2006, pp. 15-22, Available from: https://wwwnc.cdc.gov/eid/article/12/1 /05-0979 article.

TEM of HIV-antigen AIDS vaccine from yeast, Stock Image—G255/0040, Science Photo Library, at least as early as May 6, 2019, Available from: https://www.sciencephoto.com/media/211839/view/tem-of-hiv-antigen-aids-vaccine-from-yeast.

Thanh Hung, N. and Trong Lan, N., "Improvement of Case-Management—A Key Factor to Reduce Case-Fatality Rate of Dengue Haemorrhagic Fever in Southern Viet Nam," Dengue Bulletin, vol. 27, 2003 [cited May 5, 2020], pp. 144-148, Available from: https://apps.who.int/iris/handle/10665/163789.

WHO Department of Communicable Disease Surveillance and Response, "Consensus document on the epidemiology of severe acute respiratory syndrome (SARS)," WHO Dept of Communicable Disease Surveillance and Response, 2003, Available from: www.who.int/csr/sars/en/WHOconsensus.pdf.

WHO Director-General's opening remarks at the media briefing on COVID-19, Mar. 3, 2020, Available from: https://www.who.int/dg/speeches/detail/who-director-general-s-opening-remarks-at-the-media-briefing-on-covid-19.

WHO, "FAQs: H5N1 influenza," WHO, at least as early as May 6, 2019, Available from: https://www.who.int/influenza/human_animal_interface/avian_influenza/h5n1_research/faqs/en/.

WHO, "Middle East respiratory syndrome coronavirus (MERS-CoV)," WHO, Mar. 15, 2021, Available from: http://www.who.int/emergencies/mers-cov/en/.

Yellow Fever Virus, TEM—Stock Image—C036/7398, Science Photo Library, at least as early as May 6, 2019, Available from: https://www.sciencephoto.com/media/864658/view/yellow-fever-virus-tem.

Yu, I-M, Zhang, W., Holdaway, H.A., Li, L., Kostyuchenko, V.A., Chipman, P.R. et al., "Structure of the immature dengue virus at low pH primes proteolytic maturation," Science, Mar. 28, 2008, vol. 319(5871), pp. 1834-1837.

Zhang, X., Sheng, J., Plevka, P., Kuhn, R.J., Diamond, M.S., Rossmann, M.G., "Dengue structure differs at the temperatures of its human and mosquito hosts," Proc. Natl. Acad. Sci., Apr. 23, 2013, vol. 110(17), pp. 6795-6799.

Lany, S., Fioretti, A.N., Zawadzki, P.P., Schelhas, L.T., Toberer, E.S., Zakutayev, A., and Tamboli, A.C., "Monte Carlo simulations of disorder in ZnSnN2 and the effects on the electronic structure," Phys. Rev. Mater. 1 (2017).

Austin, I., Goodman, C., and Pengelly, A., "New Semiconductors with the Chalcopyrite Structure," J. Electrochem. Soc. 103, 609 (1956).

Chen, S., Narang, P., Atwater, H.A., and Wang, L., "Phase Stability and Defect Physics of a Ternary ZnSnN2 Semiconductor: First Principles Insights," Adv. Mater. 26, 311 (2014).

Du, K., Bekele, C., Hayman, C.C., Angus, J.C., Pirouz, P. and Kash, K., "Synthesis and characterization of ZnGeN2 grown from elemental Zn and Ge sources," J. Cryst. Growth 310, 1057 (2008).

Fioretti, A.N., Zakutayev, A., Moutinho, H., Melamed, C., Perkins, J.D., Norman, A.G., Al-Jassim, M., Toberer, E.S., iind Tamboli, A.G., "Combinatorial insights into doping control and transport properties of zinc tin nitride," J. Mater. Chem. C 3, 11017 (2015).

Goodman, C. and Douglas, R., "New semiconducting compounds of diamond type structure," Physica 20, 1107 (1954).

Goodman, C.H. L., "A New Group of Compounds with Diamond type (Chalcopyrite) Structure," Nature 179,828 (1957).

Heyd, J., Scuseria, G.E., and Emzerhof, M., "Hybrid functionals based on a screened Coulomb potential," J. Chem. Phys., vol. 118, pp. 8207-8215 (2003).

Iliopoulos, E., Adikimenakis, A., Dimakis, E., Tsagaraki, K., Konstantinidis, G., and Georgakilas, A., "Active nitrogen species dependence on radiofrequency plasma source operating parameters and their role in GaN growth," J. Cryst. Growth, 278, 426 (2005).

Jaffe, J. and Zunger, A., "Anion displacements and the band-gap anomaly in ternary ABC2 chalcopyrite semiconductors," Phys. Rev. B, vol. 27, pp. 5176-5179 (1983).

Koblmuller, G., Gallinat, C., and Speck, J., "Surface kinetics and thermal instability of N-face InN grown by plasma-assisted molecular beam epitaxy," J. Appl. Phys. 101, 083516 (2007).

Lambrecht, W.R., Alldredge, E., and Kim, K., "Structure and phonons of ZnGeN2," Phys. Rev. B 72, 155202 (2005).

Larson, W.L., Maruska, H.P., and Stevenson, DA, "Synthesis and Properties of ZnGeN2," J. Electrochem. Soc., vol. 121, 1673 (1974).

Martinez, A.M., Arriaga, L.G., Fernandez, A.M., and Cano, U., "Band edges determination of CuInS2 thin films prepared by electrodeposition," Mater. Chem. Phys., vol. 88, pp. 417 (2004).

Narang, P., Chen, S., Coronel, N.C., Gui, S., Yano, J., Wang, L., Lewis, N.S., and Atwater, H.A., "Bandgap Tunability in Zn(Sn,Ge)N2 Semiconductor Alloys," Adv. Mater. 26, 1235 (2014).

Paudel, T.R. and Lambrecht, W.R., "First-principles calculation of the zone center phonons in ZnSiN2: Comparison With infrared data," Phys. Rev. B 76, 115205 (2007).

Paudel, T.R. and Lambrecht, W.R., "First-principles calculations of elasticity, polarization-related properties, and nonlinear optical coefficients in Zn—IV—N2 compounds," Phys_ Rev. B, vol. 79, 245205 (2009).

Prabukanthan, P. and Dhanasekaran, R., "Growth of CuGaS2 Single Crystals by Chemical Vapor Transport and Characterization," Cryst. Growth Des. 7, 618 (2007).

Punya, A., Lambrecht, W.R., and van Schilfgaarde M., "Quasiparticle band structure of Zn—IV—N2 compounds," Phys. Rev. B 84, pp. 16520401-165204-10 (2011).

Qi, Y., Liu, Q., Tang, K., Liang, Z., Ren, Z., and Liu, X., "Synthesis and Characterization of Nanostructured Wurtzite CuInS2: A New Cation Disordered Polymorph of CuInS2," J. Phys. Chem. C 113, 3939 (2009).

Quayle, P.C., Blanton, E.W., Punya, A., Junno, G.T., He, K., Han, L., Zhao, H., Shan, J., Lambrecht, W.R.L., and Kash, K., "Charge-neutral disorder and polytypes in heterovalent wurtzite-based ternary semiconductors: The Importance of the octet rule," Phys_ Rev. B 91, pp. 205207-01-20507-14 (2015).

Quayle, P.C., He, K., Shan, J. and Kash, K., "Synthesis, lattice structure, and band gap of ZnSnN2," MRS Commun. 3, 135 (2013).

Scanlon, O. and Walsh, A., "Bandgap engineering of ZnSnP2 for high-efficiency solar cells," Appl. Phys. Lett. 100, 251911 (2012).

Van de Walle, A., Tiwary, P., de Jong, M., Olmsted, D., Asta, M., Dick, A., Shin, D., Wang, Y., Chen, L.-Q., and Liu, Z.-K., "Efficient stochastic generation of special quasirandom structures," CALPHAD: Comput. Coupling Phase Diagrams Thermo-chem., vol. 42, pp. 13-18 (2013).

Veal, T.D., Feldberg, N., Quackenbush, N.F., Linhart, W.M., Scanlon, D.O., Piper, L.F., and Durbin, S.M., "Band Gap Dependence on Cation Disorder in ZnSnN2 Solar Absorber," Adv. Energy Mater. 5, 1501462 (2015).

Viennois, R., Taliercio, T., Potin, V., Errebbahi, A., Gil, B., Charar, S., Haidoux, A., and Tedenac, J.S., "Prospective Investigations of orthorhombic ZnGeN2: synthesis, lattice dynamics and optical properties," Mater. Sci. Eng. B 82, 45 (2001).

Wang, T., Ni, C., and Janotti, A., "Band alignment and p-type doping of ZnSnN2," Phys. Rev. B 95, pp. 205205-1-205205-6 (2017).

Zunger, A., Wei, S.-H., Ferreira, L.G., and Bernard, J.E., "Special quasirandom structures," Phys. Rev. Lett. 65, 353 (1990).

Loveluck, J. and Sokoloff, J., "Theory of the optical properties of phonon systems with disordered force constants, with application to NH4Cl," J. Phys. Chem. Solids 34,869 (1973).

Berger, R.F., Fennie, C.J., and Neaton, J.B., "Band Gap and Edge Engineering via Ferroic Distortion and Anisotropic Strain: The Case of SrTiO3," Phys. Rev. Lett. 107, 146804 (2011).

Fioretti, A.N., Stokes, A., Young, M.R., Gorman, B., Toberer, E.S., Tamboli, A.C., and Zakutayev, A., "Effects of Hydrogen on Acceptor Activation in Ternary Nitride Semiconductors," Advanced Electronic Materials, vol. 3, 1600544 (2017).

Calvo, F. et al., "Non-magnetic photospheric bright points in 3D simulations of the solar atmosphere," Astronomy & Astrophysics, vol. 596, id A43, Nov. 2016, 10 pages.

(56) References Cited

OTHER PUBLICATIONS

Zhao, Junwei et al., "Tracing p-Mode Waves From the Photosphere to the Corona in Active Regions," The Astrophysical Journal Letters, 830:L17, Oct. 10, 2016, 7 pages.

Makin, Robert A. et al., "Revisiting semiconductor band gaps through structural motifs: An Isling model perspective," American Phys. Society Rev. B, vol. 102, 115202, Sep. 8, 2020, 10 pages.

Makin, Robert A. et al., "Alloy-Free Band Gap Tuning Across the Visible Spectrum," American Phys. Society Rev. Letters 122, 256403, 2019, 6 pages.

Makin, Rboert A. et al., "Quantitative Disorder Analysis of Physical Systems Across Length Scales," Western Michigan University, Kalamazoo, Michigan, Mar. 17, 2020, 7 pages.

\* cited by examiner

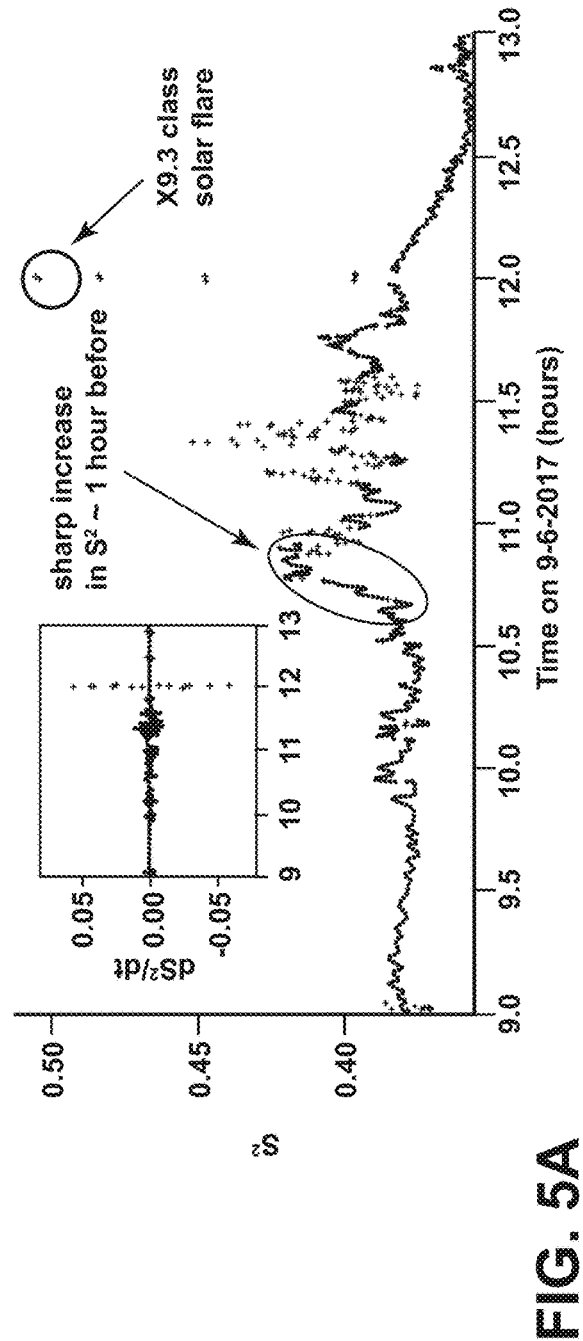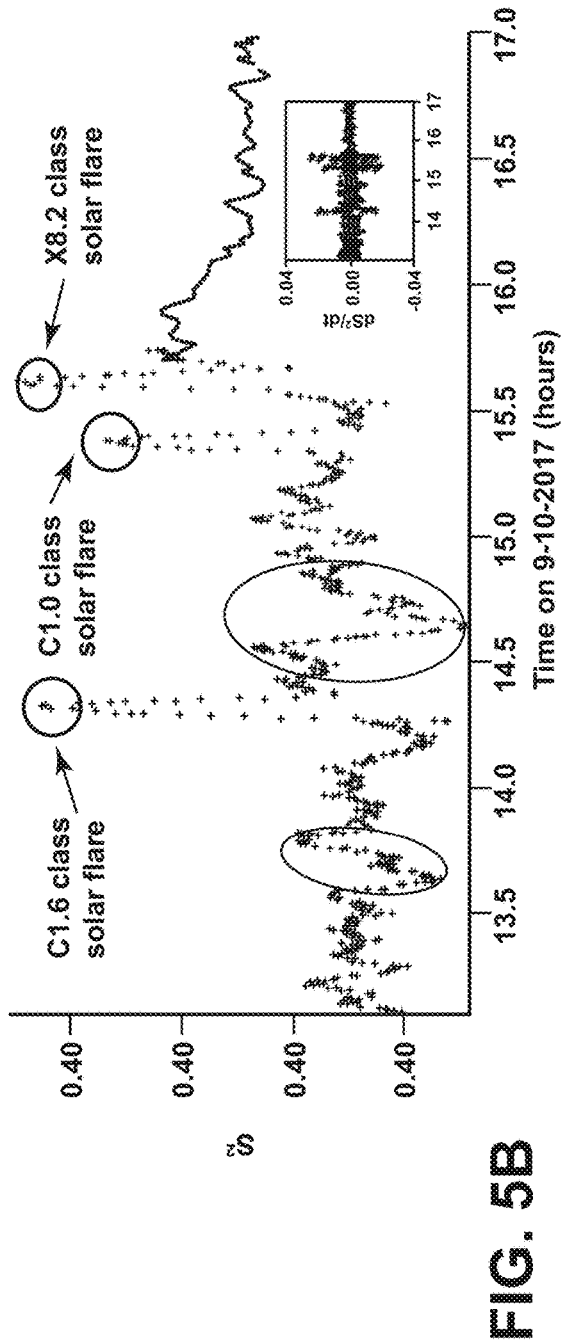
FIG. 5A
FIG. 5B

ADVANCED WARNING FOR SOLAR FLARES FROM PHOTOSPHERE IMAGE ANALYSIS

CROSS-REFERENCE TO RELATED APPLICATION

This application claims the benefit under 35 U.S.C. § 119(e) to U.S. Provisional Patent Application No. 63/192,709, filed May 25, 2021, entitled "ADVANCED WARNING FOR SOLAR FLARES FROM PHOTOSPHERE IMAGE ANALYSIS," and U.S. Provisional Patent Application No. 63/183,192, filed May 3, 2021, entitled "QUANTITATIVE DISORDER ANALYSIS OF PHYSICAL SYSTEMS ACROSS LENGTH SCALES," which are both incorporated herein by reference in their entirety.

STATEMENT REGARDING FEDERALLY SPONSORED RESEARCH OR DEVELOPMENT

This invention was made, in part, with government support under DMR-1410915 and DMR-2003581 awarded by the NSF. The government has certain rights in the invention.

BACKGROUND OF THE INVENTION

Solar flares are sudden bursts of energy believed to be caused by tangling, crossing, or reorganizing of magnetic field lines near Sun spots. The surface of the Sun has electrically charged gases that generate powerful magnetic fields. The Sun's gases are constantly moving, which tangles, stretches, and twists the magnetic fields. This motion is directly associated with solar activity.

Solar activity may have various effects on the earth, and efforts have been made to monitor solar activity. An intense solar flare releases radiation that can interfere with radio communications on earth, and also negatively impact satellite orbit through an effect known as drag. Solar flares may be accompanied by a Coronal Mass Ejection ("CME"). A CME may interfere with operation of utility grids, potentially leading to electrical shortages and power outages.

Various optical and radio telescopes have been used to observe solar flares and other solar activity. For example, the Daniel K. Inouye Solar Telescope ("DKIST") has instruments that image the Sun and measure solar magnetism.

Due to the potentially disruptive effects of solar flares and other solar weather events, efforts have been made to predict solar flares in advance. However, predicting solar flares has been a difficult challenge.

BRIEF SUMMARY OF THE INVENTION

One aspect of the present disclosure is a method for quantifying disorder, and extracting a corresponding numerical value from contrast analysis applied to optical images or other data that has been acquired of the solar atmosphere, including the photosphere. The image may be of the full disk, that is, the face of the Sun currently in view of the telescope, or a smaller region. The temporal variation of this order parameter enables prediction of solar events such as solar flares. The degree of order of the atmosphere may be monitored to predict solar flares and other significant solar events. The method may utilize a spin-based (Ising/Potts) model of disorder.

The process may involve extracting the order parameter (s) (S) or order parameter(s) squared ($S^2$) from images of the Sun or other solar atmosphere data. In general, bright and dark areas (regions) of an image correspond to ordered and disordered regions, respectively. The areas of these bright and dark areas (regions) can be determined by thresholding a greyscale image near the average pixel intensity of the bright regions. The pixel value can be found by fitting a pixel intensity histogram with two curves representing the pixel intensity distribution corresponding to disordered and ordered regions. The ratio of the area of the bright regions to the total area yields the value of $S^2$. The image threshold may be chosen at the peak of a histogram curve corresponding to ordered regions. However, image threshold may be selected in other ways. For example, the image threshold may be selected at an integer multiple of the standard deviation, $\sigma$, away from the peak depending on the relative location of the intersection of the curves for the disordered and ordered regions one or more of these steps may be implemented utilizing a computer that is configured (e.g. programmed) to execute the steps of the process.

A significant change (increase or decrease) in squared order parameter ($S^2$) may be utilized to predict an impending solar event (e.g., a solar flare). The increase in squared order parameter ($S^2$) required to predict an impending solar event may comprise predefined criteria. For example, the predefined criteria may comprise an increase in the squared order parameter ($S^2$) of at least about a specific amount (e.g., 0.01, 0.02, 0.04, 0.06, 0.080, 0.100 etc.) over a specific period of time (e.g., about 5 minutes, about 10 minutes, about 15 minutes, 20 minutes, 30 minutes, etc.). The criteria for predicting a solar event may also comprise subjective criteria whereby a user interprets a sharp increase in the squared order parameter ($S^2$) to be sufficient to indicate an impending solar event. The sharp increase may be detected by monitoring $S^2$. The sharp increase may also be detected by monitoring the first derivative (with respect to time) of $S^2$. The derivative may be calculated numerically. The derivative may also be determined directly using an analog circuit. The criteria used to predict a solar flare may comprise both quantitative and subjective criteria. For example, quantitative criteria could be utilized to automatically generate a warning if an increase in squared order parameter ($S^2$) meets predefined quantitative criteria, and the squared order parameter ($S^2$) values may also, or alternatively, be monitored by a user interpreting the changes in squared order parameter ($S^2$) to determine if a solar flare or other solar event is predicted.

These and other features, advantages, and objects of the present device will be further understood and appreciated by those skilled in the art upon studying the following specification, claims, and appended drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5A is a graph showing the squared order parameter ($S^2$) as a function of time in the vicinity of the 2017 X9.3 solar flare;

FIG. 5B is a graph showing the squared order parameter ($S^2$) for C1.6, C1.0, and X8.12 solar flares;

DETAILED DESCRIPTION

It is to be understood that the processes described herein may assume various alternative step sequences, except where expressly specified to the contrary. It is also to be understood that the specific data and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Known spin-based models of disorder (e.g., Ising/Potts models) and its corresponding quantitative measure have been utilized in various contexts. The present disclosure involves quantifying the order parameter of the photosphere of the Sun. The degree of order (e.g., the squared order parameter ($S^2$) of the solar atmosphere) may be monitored to predict solar flares and other significant solar events.

In modeling disorder in the Sun's photosphere, hydrogen (H) and helium (He) atoms present in the photosphere represent the two "spins" in the Ising model. Other elements may be present in the photosphere, and they may be included in a model according to the present disclosure by adding each element as an additional spin. In general, this does not result in changes or errors in the extraction of the order parameter ($S^2$) from the data.

Figure 1:
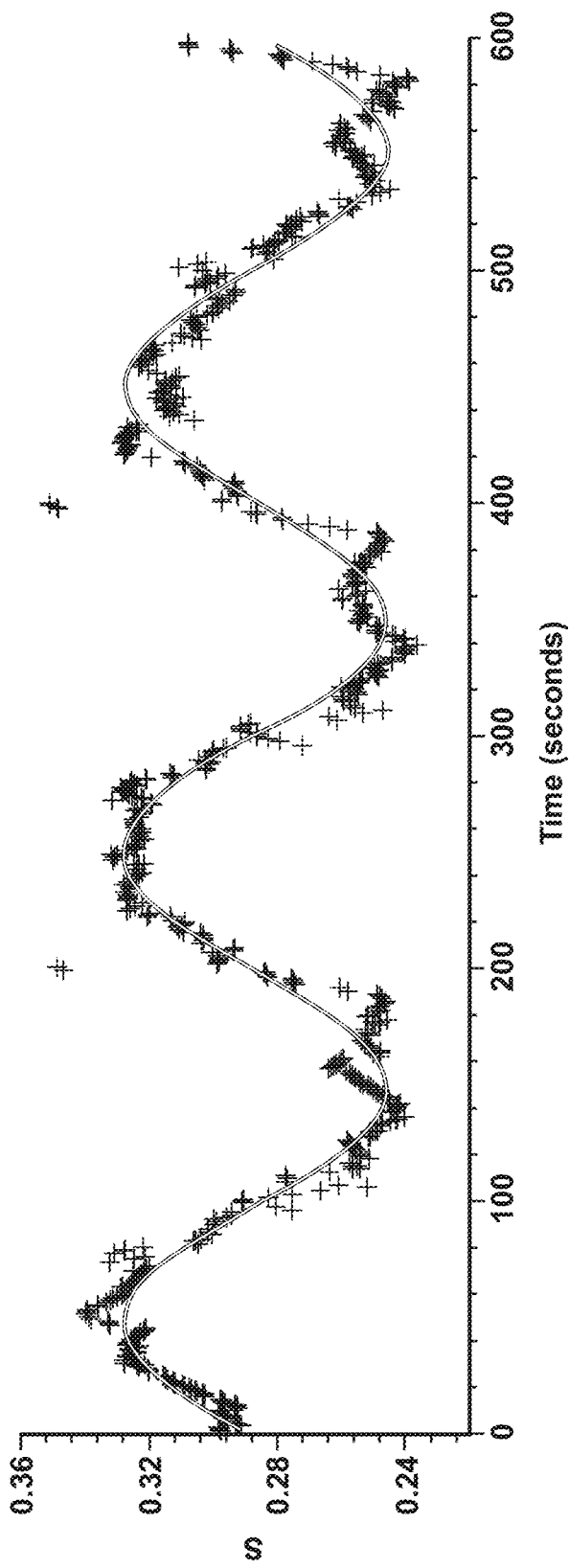
FIG. 1 is a graph showing the squared order parameter ($S^2$) of the photosphere extracted from images captured by DKIST at a wavelength of 705 nm.

As discussed in more detail below, the squared order parameter ($S^2$) can be extracted from solar atmosphere images by thresholding image data into dark and bright regions (areas), followed by dividing the number of bright pixels by the total number of pixels within a region of interest. As also discussed in more detail below, a disorder analysis, according to the present disclosure, may be accomplished by software that is capable of performing near real-time, semi-automated image analysis from streaming or "live" sources. In one example (FIG. 1), this methodology of quantifying the order parameter was applied to solar photosphere images released from the Daniel K. Inouye Solar Telescope (DKIST). The images were captured at a wavelength of 705 nm. The resulting analysis detects (i.e., shows) oscillations in order parameter (S) as a function of time. In this example, the period of oscillations is approximately 200 seconds, which is somewhat similar to the oscillation period of approximately 300 seconds obtained from published observations of the power output of the Sun. In FIG. 1, an additional phase-delayed oscillatory component of smaller peak magnitude is also in evidence, and it may be a signature of two different-sized regions of cells oscillating out of phase within the image area. As discussed in more detail below, FIG. 1 shows the of the order parameter (S), which is calculated (determined) from the value of $S^2$ that is directly obtained from image analysis.

Figure 2:
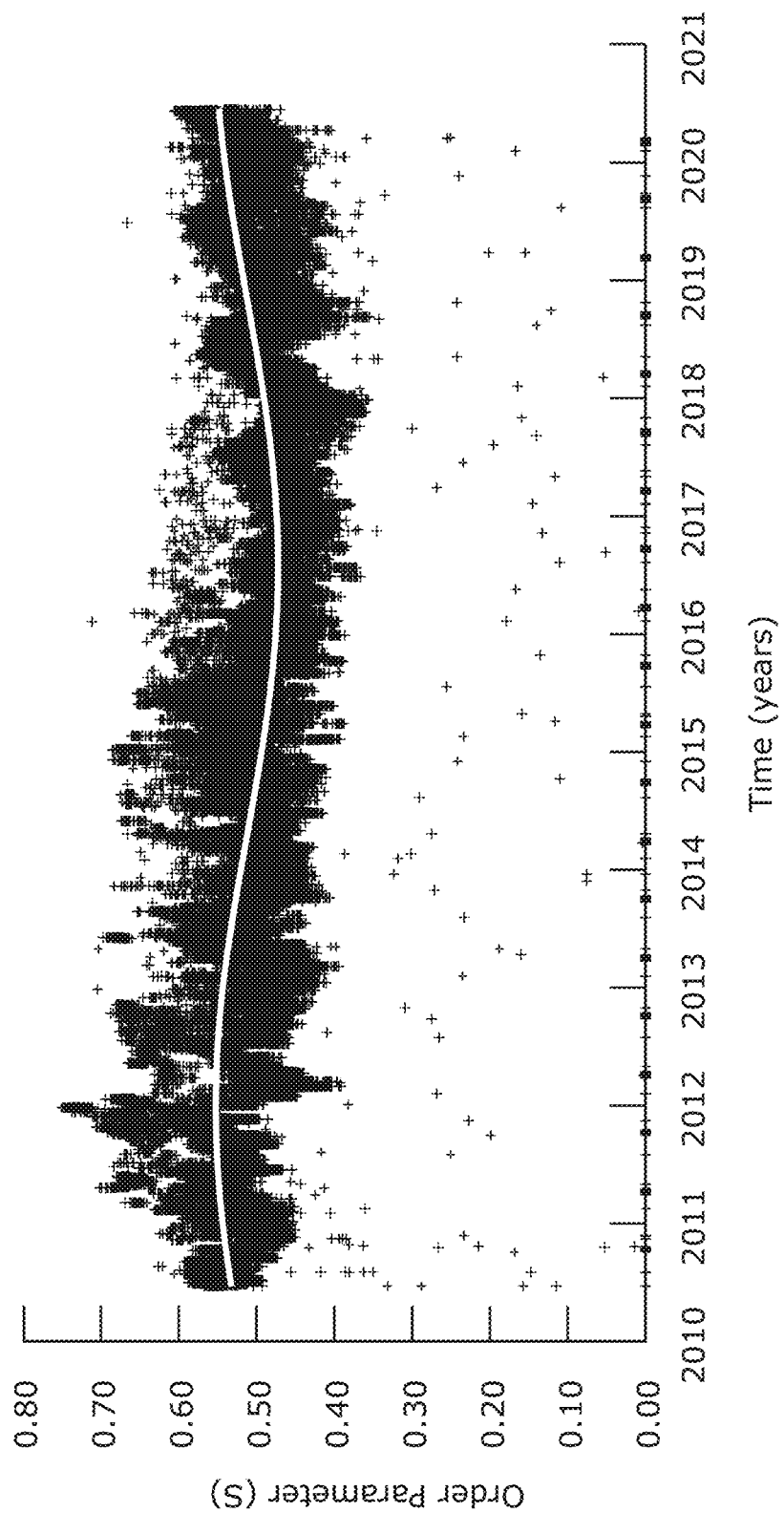
FIG. 2 is a graph of the squared order parameter ($S^2$) as a function of time (years), wherein the data was obtained by the Atmospheric Imaging Assembly (AIA) instrument in NASA's Solar Dynamics Observatory (SDO) at a wavelength of 17.1 nm.

With further reference to FIG. 2, the analysis has also been applied to a historical 10-year set of photosphere images from the Solar Dynamics Observatory operated by NASA. As shown in FIG. 2, the data contains multiple high-frequency components. The analysis also revealed an underlying multi-year period oscillation, which is highlighted in red in FIG. 2. Fourier analysis and/or curve fitting may be utilized to determine the period of oscillations. In the example of FIG. 2, a combination of Fourier analysis and curve fitting was used to determine that the multi-year oscillation has a period of 9.14 years, which is similar to the current estimate of 11 years for the period of the solar cycle.

Figure 4:
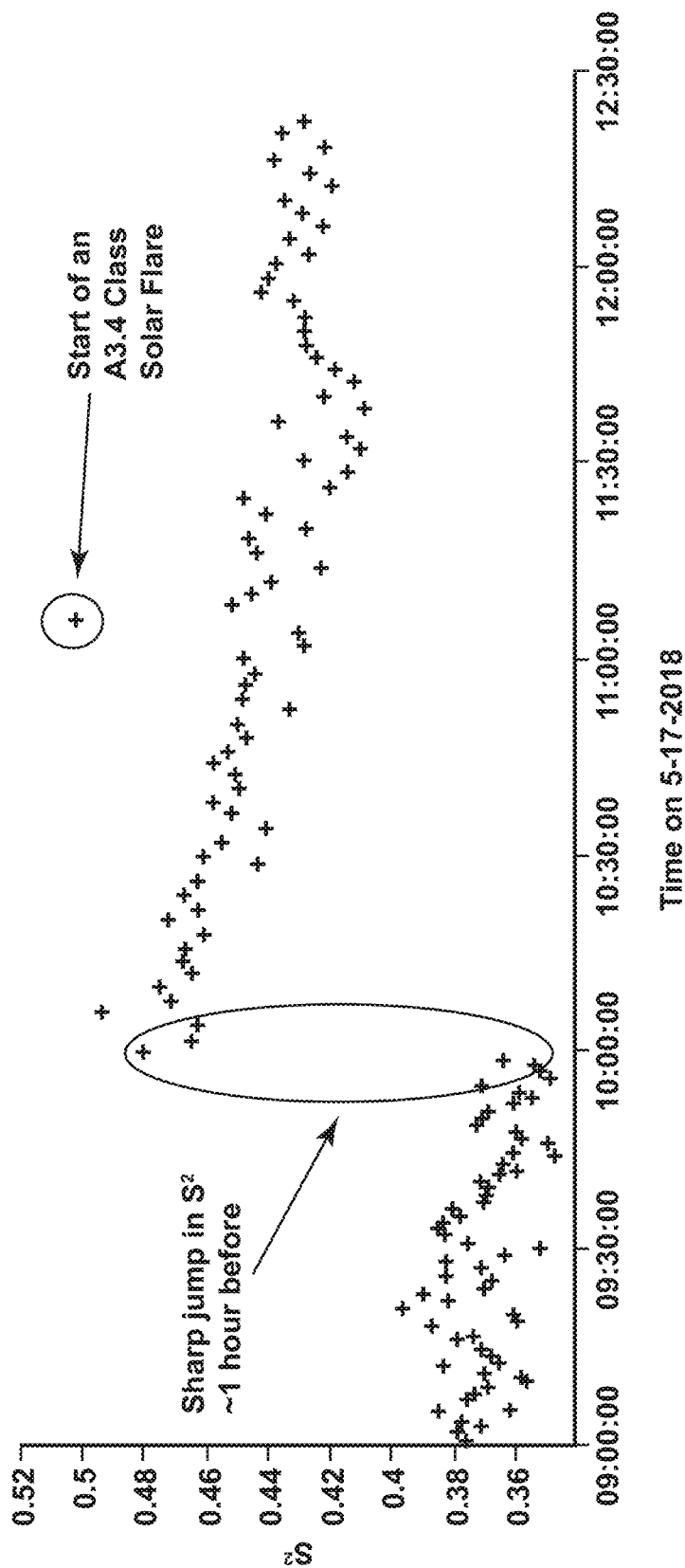
FIG. 4 is a graph showing squared order parameter ($S^2$) as a function of time in the vicinity of a documented A3.4 class solar flare.

The portion of FIG. 2 with higher spike density (2011-2015) corresponds to active years of the solar cycle where many solar flares have been observed. The data in FIG. 2 shows that the order parameter (S) and the directly related quantity of squared order parameter ($S^2$) tend to spike approximately an hour before an observed solar flare. The data in FIG. 2 has a sample rate of one hour, however, so an additional analysis was performed on selected easily identifiable solar flares on a finer timescale of 2-minute intervals as shown in FIG. 4. FIG. 4 is a chart showing squared order parameter ($S^2$) as a function of time in the vicinity of a document A3.4-class solar flare on May 17, 2018. The squared order parameter ($S^2$) values of FIG. 4 were extracted from full disk images of the Sun taken at 17.1 nm wavelength by the Atmospheric Imaging Assembly (AIA) on NASA's Solar Dynamics Observatory (SDO). The data shows that approximately an hour before the solar flare there is a sharp jump in the order parameter, followed by a spike in squared order parameter ($S^2$) at the time of the start of the solar flare. Thus, squared order parameter ($S^2$) can be extracted from images of the solar atmosphere and monitored to provide an advance warning of approximately one hour prior to an impending solar flare of related solar event.

This process may be utilized to provide/generate an early warning to protect critical communication systems and power grids. Warnings are currently performed in the case of solar flares through "weather" modeling, which may not be sufficiently accurate. A disorder-based analysis, according to the present disclosure, may provide approximately one hour of warning, which may be sufficient to issue a protective directive to earth-orbiting satellites, other space probes in the solar system, and earth-based power grids, thereby reducing the disruption that otherwise occurs during a solar flare event. The disorder analysis may also be utilized to predict types of solar events or eruptions such as Coronal Mass Ejections ("CME"), which take longer to travel to earth, but may also be extremely disruptive.

Figure 3B:
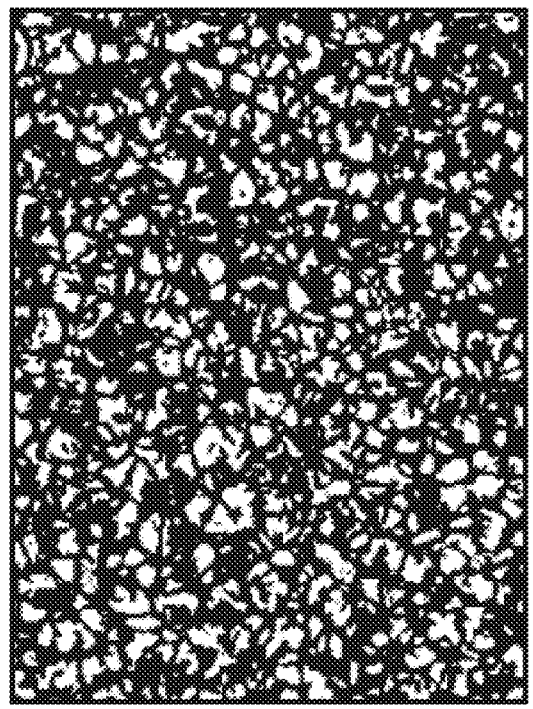
FIG. 3B is a pixel intensity histogram, showing the fitting of the overall intensity distribution and the decomposition into two curves, corresponding to the disordered and ordered components of the structure, respectively.
Figure 3A:
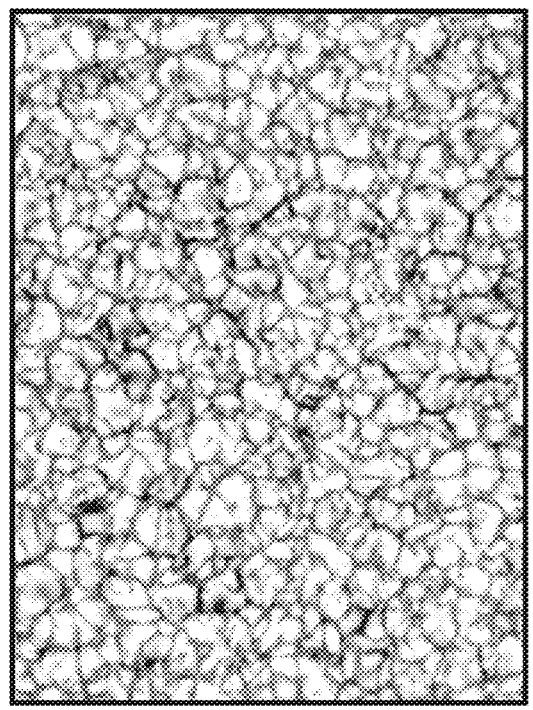
FIG. 3A is a representative still frame from a solar photosphere movie acquired at 705 nm by the Inouye telescope.
Figure 3C:
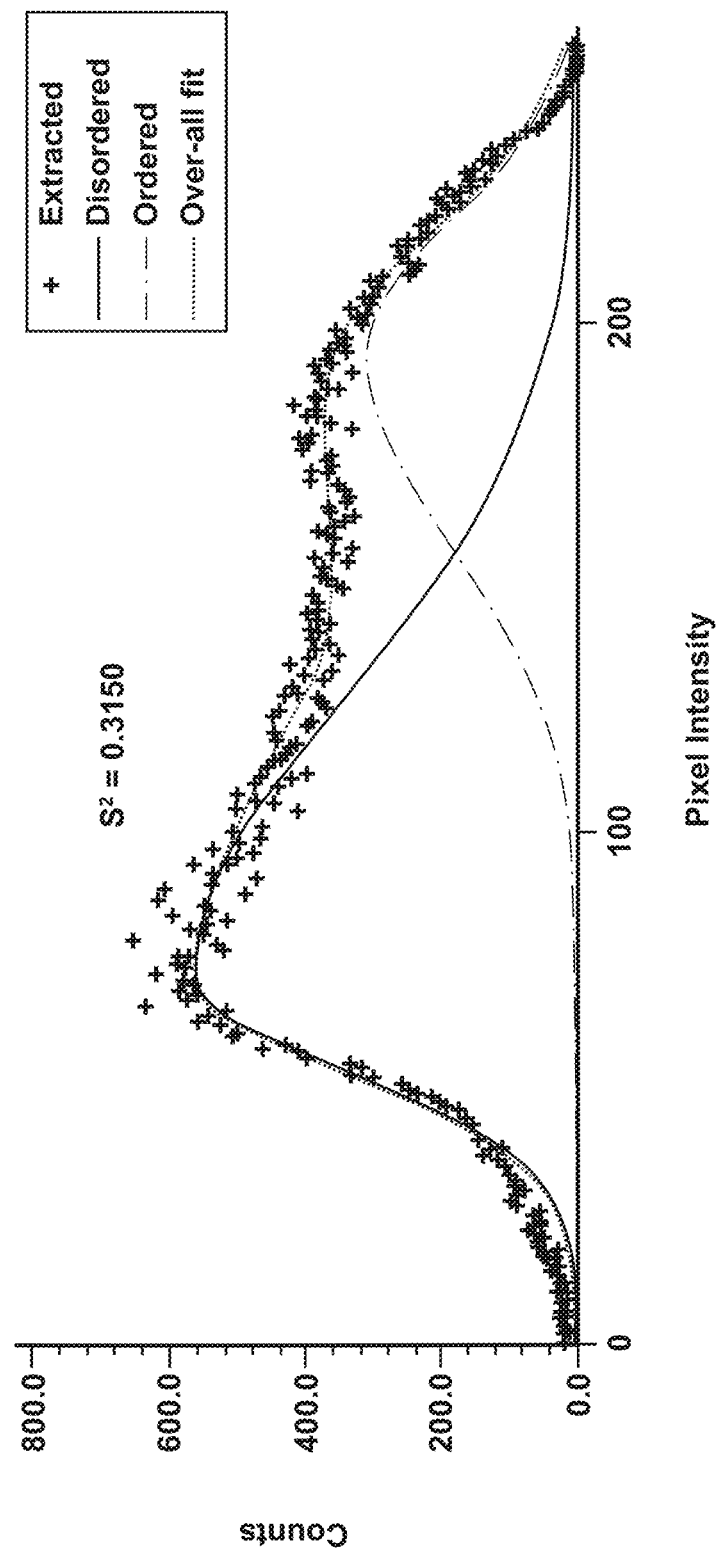
FIG. 3C is a thresholded image based on the peak height of the ordered curve in FIG. 3B, yielding a squared order parameter ($S^2$) value of 0.3150.

FIG. 3A is a representative still frame from a photosphere movie acquired at 705 nm and released by DKIST. FIG. 3B is a pixel intensity histogram, showing the fitting of the overall intensity distribution and decomposition into two curves, corresponding to the disordered and ordered components of the structure of FIG. 3A, respectively. FIG. 3C is a thresholded image based on the peak height of the ordered curve in FIG. 3B, yielding a squared order parameter ($S^2$) value of 0.3150. The thresholding process and pixel intensity histogram are discussed in more detail below in connection with FIG. 8.

In general, an image will include bright regions and dark regions, and the squared order parameter ($S^2$) value of a sample is equal to the percentage of bright regions to the total image area. The bright and dark areas corresponding to the ordered and disordered regions, respectively, can be determined by thresholding the image near the average pixel intensity of the bright regions. This pixel value can be found by fitting the pixel intensity histogram with two curves representing the pixel intensity distribution from the disordered and ordered regions. The image threshold is generally chosen at the peak of the curve in FIG. 3B corresponding to the ordered regions, although it may be selected at an integer multiple of the standard deviation, σ, away from the peak depending on the relative location of the intersection of the two curves.

FIGS. 5A and 5B show detection of the onset of conditions that led to the eruption of an A3.4-class solar flare almost an hour in advance, using data extracted from the Atmospheric Imaging Assembly (AIA) on NASA's SDO. Far in advance of any intensity variation, the ordering of the solar atmosphere in the vicinity of the flare undergoes a significant change, indicating a physical reorganization that may enable the buildup of energy subsequently released in the flare. A primary interest in flare prediction is to protect systems on earth or in earth orbit so that it is worthwhile to consider what, if any, order parameter changes accompanied the X9.3 flare (FIG. 5A) in September 2017. Similar to the A-class flare in FIG. 4, there is an onset condition in the squared order parameter ($S^2$) value of the full disk image of the Sun approximately an hour in advance of the X9.3 flare, as illustrated in FIG. 5A. This same approximate one-hour advance onset condition occurs as well for the C1.6, C1.0, and X8.2 class flares in FIG. 5B. Thus, the present disclosure provides a straightforward approach to solar flare prediction over a wide range of flare intensities based on order parameter extraction from telescope images.

In the examples discussed above, changes in squared order parameter ($S^2$) sufficient to predict a solar flare occurred approximately one hour before the solar flares. However, it may be possible to predict solar flares more than an hour prior to the solar flare utilizing measurements and calculations of the order parameter according to other aspects of the present disclosure. Also, the information extracted from squared order parameter ($S^2$) analysis of the full disk and smaller area images of the Sun can also provide information that could be used to enhance modeling of solar dynamics. For example, a "heatmap" type plot of squared order parameter ($S^2$) can be generated from an image, including a full disk image, by dividing the thresholded image into a two-dimensional mesh of equal area triangles. The squared order parameter ($S^2$) value of each region can then be calculated by taking the fraction of bright pixels to the total number of pixels within the segment to produce a map of squared order parameter ($S^2$) across the image.

Figures 6A, 6B, 6C:
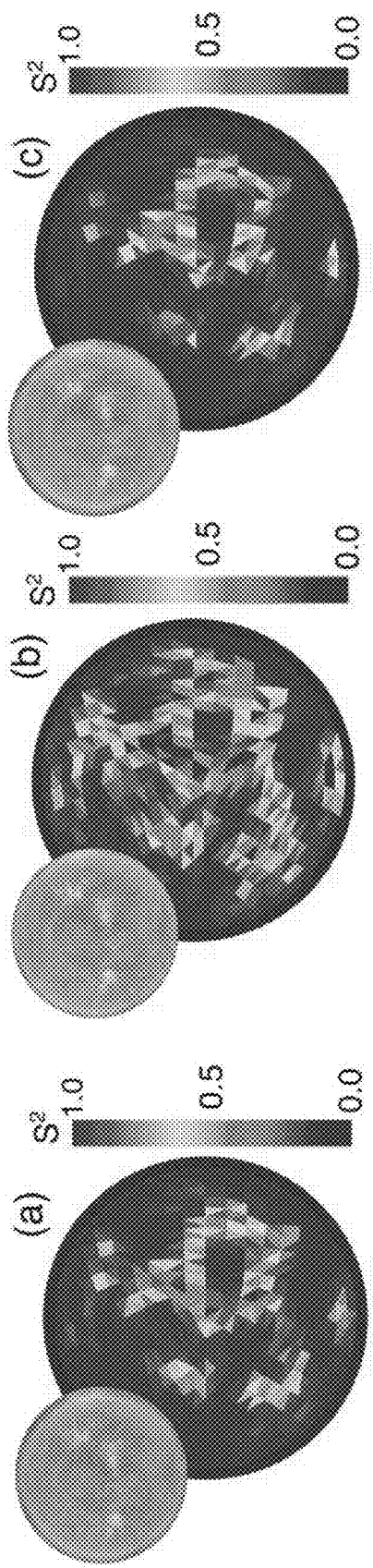
FIG. 6A is an $S^2$ mapping for the photosphere just before the 2017 X9.3 solar flare at 3:06 am UTC, wherein the image to the top left is a full disk image at 17.1 nm for the corresponding timeframe obtained by the Atmospheric Imaging Assembly (AIA) in NASA's SDO.
FIG. 6B is a mapping of the squared order parameter ($S^2$) for the photosphere just before the 2017 X9.3 solar flare at 3:07 am UTC, wherein the image to the top left is a full disk image at 17.1 nm for the corresponding timeframe obtained by the Atmospheric Imaging Assembly (AIA) in NASA's SDO.
FIG. 6C is a mapping of the squared order parameter ($S^2$) for the photosphere just before the 2017 X9.3 solar flare at 3:08 am UTC, wherein the image to the top left is a full disk image at 17.1 nm for the corresponding timeframe obtained by the Atmospheric Imaging Assembly (AIA) in NASA's SDO.

FIGS. 6A-6C show progression of squared order parameter ($S^2$) mapping over a 5-minute interval 4 hours prior to the X9.3 flare identified in FIG. 5A. Such mappings aid visualization of the spatial redistribution of disorder within the system, which in FIGS. 6A-6C appears to be most active in the right near-equatorial side of the full disk, where a disorder-dominated ring surrounds a highly-ordered region which is the eventual eruption location of the X9.3 flare. The temporal variation of disorder and interactions between regions correspond to the dynamic behavior of kinetic and potential energy within the system. It can be shown that the kinetic energy associated with ordering is $$\frac{1}{2}m\left[\frac{dS}{dt}\right]^2$$

and the potential energy associated with ordering is $\frac{1}{2}kS^2$, where m and k are constants related to the characteristics of disorder within the system. Adding in a damping force that is proportional to order parameter (S), a simple damped harmonic oscillator Lagrangian of the form $\mathcal{L}=(T-U)e^{\alpha t}$ can be constructed in terms of order parameter (S), specifically:

$$\mathcal{L} = \frac{1}{2}\left[m\left[\frac{dS}{dt}\right]^2 - kS^2\right]e^{\alpha t} \tag{1}$$

The oscillations seen in the order parameter (S) plot in FIG. 1 may be understood as undamped simple harmonic motion of order parameter (S) in the solar atmosphere. This result provides evidence that the state of ordering, represented through either the order parameter (S) or the squared order parameter ($S^2$), represents a fundamental parameter of solar dynamics whose experimentally measured values can be used to potentially validate models and inform their development. Different layers of the solar atmosphere can be examined by, for example, acquiring images at specific wavelengths.

The ability to extract a value for the order parameter of the solar atmosphere may provide several advantages. Previous work has demonstrated that the order parameter can be related to specific system properties when those properties are dominated by pair interactions (see, e.g., Makin, R. A. et al., "Alloy-free band gap tuning across the visible spectrum," Physical Review Letters 122, 256403, 2019; and Makin, R. A. et al., Revisiting semiconductor band gaps through structural motifs: An Ising model perspective," Physical Review B 102, 115202, 2020). In the case of semiconductors, one such property is the band gap energy of the material, which exhibits a linear relationship with squared order parameter ($S^2$). Using a cluster expansion up to pair-wise terms along with a spin-based representation of the system, such as the Ising-model, a system level property P can be expressed in terms of squared order parameter ($S^2$) as:

$$P(x, S)=S^2[P(0.5,1)-P(x, 0)]+P(x, 0) \tag{2}$$

Figure 7:
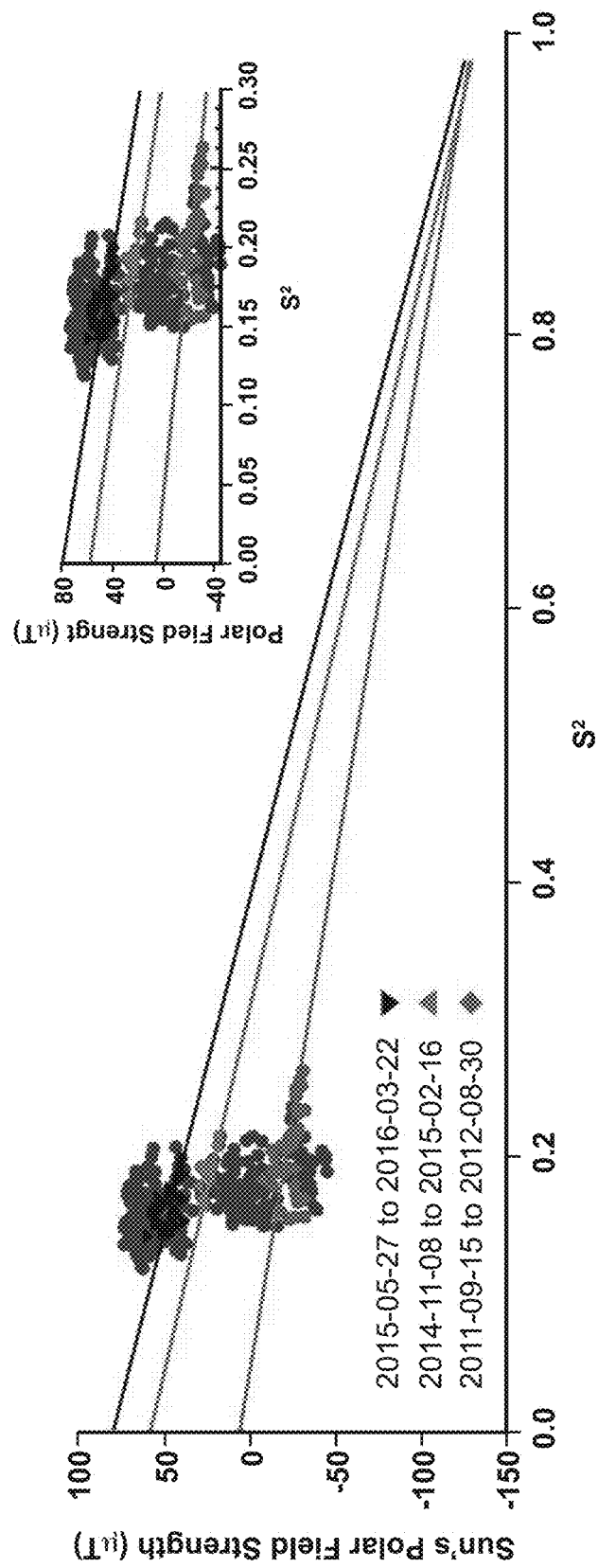
FIG. 7 is an Ising model plot of the solar polar field strength as a function of squared order parameter ($S^2$), wherein the red, green, and yellow data represent contiguous time periods, each approximately one year long, wherein the inset is an enlarged view of the data.

In the context of the solar atmosphere, the mean polar field strength appears to exhibit a linear relationship with squared order parameter ($S^2$) as predicted by Eq. 2. For example, FIG. 7 shows the mean polar field strength plotted as a function of squared order parameter ($S^2$) over an entire decade of measurements (2010 to 2020) obtained from the Wilcox Solar Observatory and NASA's SDO. FIG. 7 is an Ising model plot of the solar polar field strength as a function of the squared order parameter ($S^2$), determined from full disk images of the sun taken at a wavelength of 17.1 nm. The red, green, and yellow data represent contiguous time periods, each approximately one year long. The inset is a magnified view of the data to better highlight the linear trends. The data of the FIG. 7 was obtained from the Wilcox Solar Observatory and NASA's SDO.

For contiguous time periods of approximately one year in length, the measured mean polar field strength values all lie on the same $S^2$ line—highlighted for three such time periods in FIG. 7. In terms of Eq. 2, this would imply that the composition of the system being imaged (x) is nominally the same for points that lie on the same line. These results suggest that the composition of the atmosphere varies with time. It can be seen that measurements of the order parameter of the solar atmosphere provide a variety of insights into the characteristics and behaviors of the Sun beyond simply the degree of ordering in the atmosphere.

Figure 8:
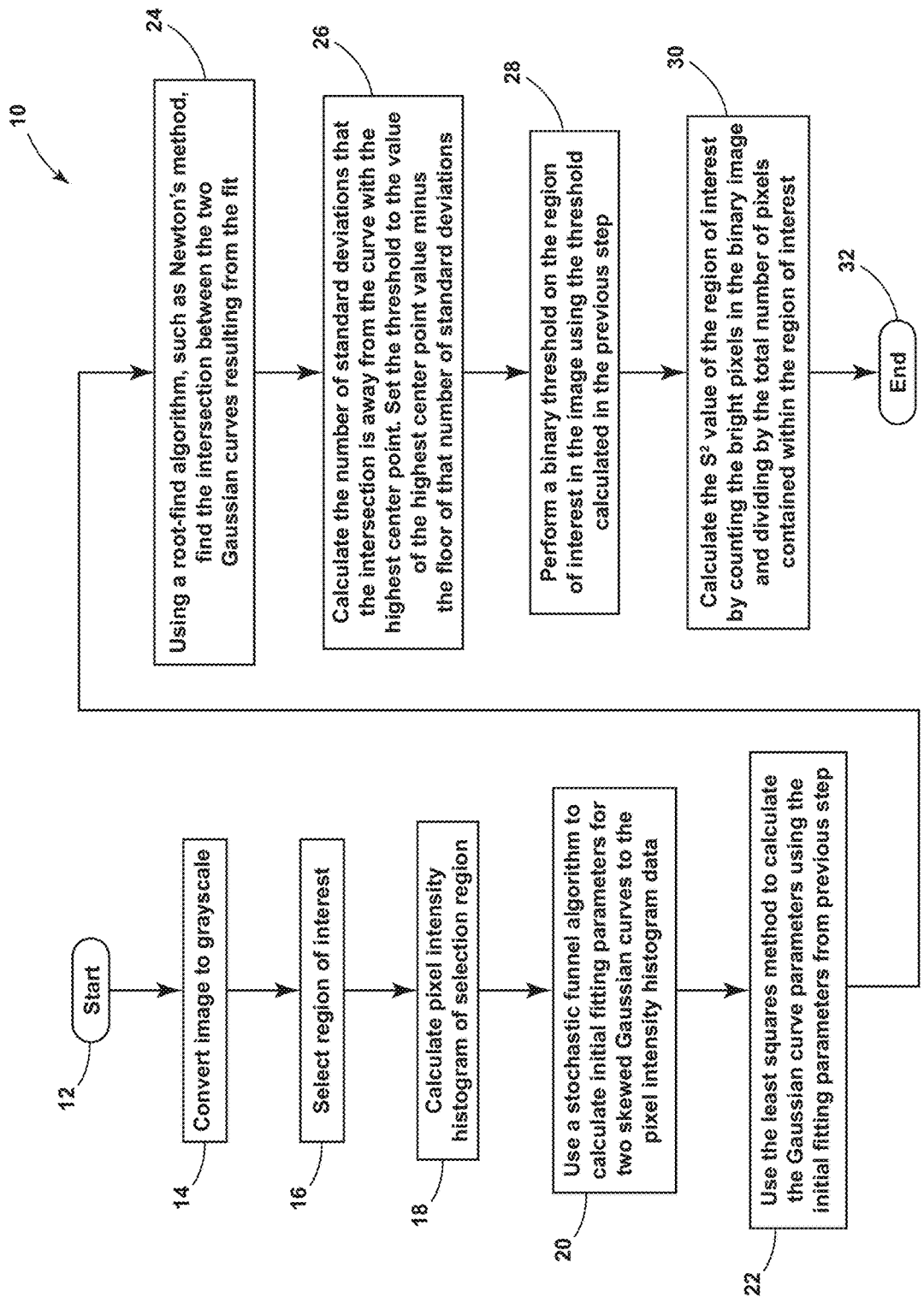
FIG. 8 is a flowchart showing a procedure for calculating the threshold value of an image.

With reference to FIG. 8, a process 10 for calculating the threshold value of a digital image 10 is shown. Process 10 may be implemented utilizing a computer that is programmed to one or more of the steps of process 10. Process 10 starts at 12, and proceeds to step 14, which includes converting the image to greyscale. A region of interest may be selected as shown in step 16. In general, the region of interest may be selected before or after converting an image to greyscale. The region of interest may be selected by an individual inspecting one or more solar atmosphere images, or the region of interest may be selected by a computer algorithm. For example, the algorithm may select a region of interest corresponding to a portion of the Sun's surface whereby the same portion of the Sun's surface is utilized in a series of images despite relative movement of the Sun.

The process 10 further includes calculating a pixel intensity histogram of the selected region (see, e.g., FIG. 3B). At step 20, a computer-implemented algorithm (e.g. a stochastic funnel algorithm) is used to calculate initial fitting parameters for two skewed Gaussian curves to the pixel intensity histogram data. In the example of FIG. 3B, the skewed Gaussian curves are shown as the disordered and ordered curves, and the over-all fit is also shown in FIG. 3B. Referring again to FIG. 8, at step 22, the least squares method is used to calculate the Gaussian curve parameters using the initial fitting parameters from step 20.

At step 24, a root-finding algorithm (e.g., Newton's method) is used to find the) standard deviations that the intersection is away from the curve where the highest center point is calculated. The threshold value is set to the value of the highest center point value minus the floor of that number of standard deviations.

At step 28, a binary threshold is performed on the region of interest in the image using the threshold calculated in step 26. An example of the results of thresholding are shown in FIG. 3C. At step 30, the squared order parameter ($S^2$) value of the region of interest is calculated by counting the bright pixels in the binary image and dividing this number by the total number of pixels contained with the region of interest. The method 10 then ends as shown at 32.

Although only a few embodiments of the present innovations have been described in detail in this disclosure, those skilled in the art who review this disclosure will readily appreciate that many modifications are possible (e.g., variations in the process used to extract order parameter (S) and squared order parameter ($S^2$), the order of the steps, values of parameters, use of colors, orientations, etc.) without materially departing from the novel teachings and advantages of the subject matter recited. Also, as used herein, the term "order parameter" may generally refer to the order parameter (S), order parameter ($S^2$), and/or other variables or values that incorporate or relate to the order parameter as described herein.

It will be understood that any described processes or steps within described processes may be combined with other disclosed processes or steps within the scope of the present device. The exemplary processes disclosed herein are for illustrative purposes and are not to be construed as limiting.

The above description is considered that of the illustrated embodiments only. Modifications of the process will occur to those skilled in the art and to those who use the process. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A method of protecting solar-weather vulnerable devices and systems by predicting disruptive solar events, the method comprising:
   repeatedly extracting numerical values corresponding to an order parameter, wherein said order parameter is S or $S^2$, from a plurality of sets of solar atmosphere data measured over time, wherein the plurality of sets of solar atmosphere data comprise images of the Sun, and the numerical values corresponding to order parameter are extracted from a series of images of the Sun, wherein
   at least some of the images of the Sun include bright regions and dark regions and wherein:
   extracting the numerical values corresponding to order parameter comprises thresholding the images of the Sun to determine an area of the bright regions,
   selecting regions of interest of the images of the Sun, and
   determining a squared order parameter value ($S^2$) by calculating a ratio of the area of the bright regions to a total area of the regions of interest of each image of the Sun; and
   predicting a solar event if a change in the extracted numerical values satisfies prediction criteria, wherein the prediction criteria comprise a predefined increase in numerical values corresponding to the order parameter over a pre-defined interval of time.

2. The method of claim 1, wherein:
   thresholding the images of the Sun includes converting the images to greyscale images;
   calculating a pixel intensity histogram for each of the greyscale images;
   fitting the pixel intensity histogram with first and second curves that sum to an overall curve fit of the pixel intensity histogram, wherein the first and second curves represent pixel intensity distributions from disordered and ordered regions, respectively, and wherein a higher one of the first and second curves has a peak that is higher than the other of the first and second curves;

determining an intersection of the first and second curves;

determining a distance comprising a number of standard deviations that the intersection is away from the highest peak among the first and second curves;

setting a threshold to the highest center point value of said highest peak among the first and second curves less the lowest first or second curve value within that number of standard deviations;

performing a binary threshold on each greyscale image to form a binary image; and calculating an order parameter squared ($S^2$) value for each greyscale image by counting the number of bright pixels in the binary image and dividing the number of bright pixels in the binary image by the total number of pixels contained in each greyscale image.

3. The method of claim 2, wherein thresholding the images of the Sun further includes selecting a region of interest prior to calculating a pixel intensity histogram; and wherein:

the pixel intensity histogram is calculated for the region of interest; and the $S^2$ value is calculated for the region of interest.

4. The method of claim 1, wherein:

the predefined increase in numerical values corresponding to order parameter comprises an increase of at least 5% over a period of 30 minutes or less.

5. The method of claim 1, wherein:

the predefined increase in numerical values corresponding to order parameter comprises an increase of at least 0.04.

6. The method of claim 1, including:

fitting a curve to the $S^2$ values, wherein the curve comprises $S^2$ values over time; and wherein:

the prediction criteria comprises a slope in the curve that meets or exceeds a predefined slope.

7. The method of claim 1, wherein:

the solar atmosphere data comprise frames from a solar photosphere movie.

8. The method of claim 1, wherein:

the solar atmosphere data comprise frames from a movie comprising a sequence of images of a specific layer of the solar atmosphere.

9. The method of claim 1, including:

utilizing a computer to repeatedly extract numerical values corresponding to an order parameter from a plurality of sets of solar atmosphere data measured over time;

utilizing a computer to predict a solar event if a change in the extracted numerical values satisfies prediction criteria.

10. The method of claim 1, further comprising providing a protective directive if a solar event is predicted.

11. The method of claim 10, wherein the protective directive is provided at least one hour prior to the predicted solar event.

12. The method of claim 10, further comprising protecting a solar-weather vulnerable device or system from disruption upon receipt of the protective directive.

13. The method of claim 1, wherein the solar event is a solar flare or a CME.

14. A computer-implemented method of protecting solar-weather vulnerable devices and systems by predicting disruptive solar events, the method comprising:

utilizing a computer to repeatedly extract numerical values corresponding to an order parameter from sets of digital solar atmosphere data measured over time, wherein the sets of solar atmosphere data comprise digital images of the Sun, and the numerical values corresponding to order parameter are extracted from a series of digital images of the Sun utilizing a computer, and wherein at least some of the digital images of the Sun include bright regions and dark regions, and extracting the numerical values corresponding to order parameter comprises utilizing a computer to threshold the digital images of the Sun to determine an area of the bright regions, selecting regions of interest of the digital images of the Sun, and utilizing a computer to determine a squared order parameter value ($S^2$) by calculating, using a computer, a ratio of the area of the bright regions to a total area of the regions of interest of each digital image of the Sun; and utilizing a computer to predict a solar event if a change in the extracted numerical values satisfies prediction criteria, wherein the prediction criteria comprise a predefined increase in numerical values corresponding to the order parameter over a predefined interval of time.

15. The method of claim 14, wherein:

thresholding the digital images of the Sun includes utilizing a computer to convert the digital images to greyscale digital images, utilizing a computer to calculate a pixel intensity histogram for each of the greyscale images, utilizing a computer to fit the pixel intensity histogram with first and second curves that sum to an overall curve fit of the pixel intensity histogram, wherein the first and second curves represent pixel intensity distributions from disordered and ordered regions, respectively, and wherein a higher one of the first and second curves has a peak that is higher than the other of the first and second curves, utilizing a computer to determine an intersection of the first and second curves, utilizing a computer to determine a distance comprising a number of standard deviations that the intersection is away from the highest peak among the first and second curves, utilizing a computer to set a threshold to the highest center point value of said highest peak among the first and second curves less the lowest first or second curve value within that number of standard deviations, utilizing a computer to perform a binary threshold on each greyscale digital image to form a binary digital image; and calculating an order parameter squared ($S^2$) value for each greyscale digital image by counting the number of bright pixels in the binary digital image and dividing the number of bright pixels by the total number of pixels contained in each greyscale digital image.

16. The method of claim 14, further comprising providing a protective directive if a solar event is predicted.

17. The method of claim 16, further comprising protecting a solar-weather vulnerable device or system from disruption upon receipt of the protective directive.

18. The method of claim 16, wherein the protective directive is provided at least one hour prior to the predicted solar event.

19. The method of claim 14, wherein the solar event is a solar flare or a CME.

* * * * *